(12) United States Patent
Glew et al.

(10) Patent No.: US 10,941,266 B2
(45) Date of Patent: *Mar. 9, 2021

(54) FLUOROPOLYMER ALLOYS FOR USE IN HIGH PERFORMANCE COMMUNICATION CABLES AND METHODS OF MAKING

(71) Applicant: Cable Components Group, LLC, Pawcatuck, CT (US)

(72) Inventors: Charles A. Glew, Charlestown, RI (US); Nicolas M. Rosa, Westerly, RI (US)

(73) Assignee: Cable Components Group, LLC, Pawcatuck, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/736,082

(22) Filed: Jan. 7, 2020

(65) Prior Publication Data

US 2020/0140645 A1 May 7, 2020

Related U.S. Application Data

(63) Continuation of application No. 15/868,429, filed on Jan. 11, 2018, now Pat. No. 10,526,466.

(60) Provisional application No. 62/445,035, filed on Jan. 11, 2017.

(51) Int. Cl.

| C08L 23/28 | (2006.01) |
|---|---|
| C08J 9/228 | (2006.01) |
| H01B 3/44 | (2006.01) |
| C08L 101/00 | (2006.01) |

(52) U.S. Cl.
CPC ............... *C08J 9/228* (2013.01); *C08L 23/28* (2013.01); *C08L 101/00* (2013.01); *H01B 3/445* (2013.01); *C08J 2207/06* (2013.01); *C08J 2327/12* (2013.01); *C08J 2327/16* (2013.01)

(58) Field of Classification Search
CPC ....... H01B 3/445; C08J 9/228; C08J 2207/06; C08J 2327/16; C08J 2327/12; C08L 23/28; C08L 27/12; C08L 69/00; C08L 27/16; C08L 33/12
See application file for complete search history.

(56) References Cited

U.S. PATENT DOCUMENTS

| 7,098,405 | B2 | 8/2006 | Glew | |
| 2007/0151745 | A1 | 7/2007 | Glew | |
| 2008/0066947 | A1 | 3/2008 | Glew | |
| 2010/0206609 | A1 | 8/2010 | Glew | |
| 2018/0322985 | A1* | 11/2018 | Glew et al. | ............... H01B 1/22 |

* cited by examiner

*Primary Examiner* — Nathan M Nutter
(74) *Attorney, Agent, or Firm* — Levenfeld Pearlstein, LLC

(57) ABSTRACT

Described herein are solid and foamable fluoropolymer alloy compositions and foamed articles using said foamable fluoropolymer alloy compositions. The foamable fluoropolymer alloy compositions can comprise a fluoropolymer, and a plastic polymer mixed with said fluoropolymer, wherein said plastic polymer is miscible with said fluoropolymer. The fluoropolymer alloy composition may further comprise a foaming agent. By way of example, the foaming agent can be talc or a talc derivative, or a mixture of talc (or talc derivative) with a citrate compound, such as a citrate salt. One or more additives are added to render the compositions flame retardant and/or smoke suppressant.

17 Claims, 10 Drawing Sheets

FLUOROPOLYMER ALLOYS FOR USE IN HIGH PERFORMANCE COMMUNICATION CABLES AND METHODS OF MAKING

CROSS-REFERENCE TO RELATED APPLICATIONS

The present application is a continuation of U.S. patent application Ser. No. 15/868,429, filed Jan. 11, 2018, now U.S. Pat. No. 10,526,466, which claims the benefit of Provisional U.S. Patent Application Ser. No. 62/445,035, filed Jan. 11, 2017, the disclosures of which are hereby incorporated by reference in its entirety.

BACKGROUND OF INVENTION

The present invention relates generally to polymeric compositions and a variety of articles that can be formed using such polymeric compositions, e.g., for incorporation in communications cables.

A broad range of electrical cables and buffered optical fibers cables are installed in modern buildings for a wide variety of uses. These cables are used, for example, to provide data transmission between computers, voice communications, as well as control signal transmission for building security, fire alarms, and temperature control systems. Cable networks extend throughout modern office and industrial buildings, and frequently extend through the space between the dropped ceiling and the floor above.

Ventilation system components are also frequently extended through this space for directing heated and chilled air to the space below the ceiling and also to direct return air exchange. The space between the dropped ceiling and the floor above is commonly referred to as the plenum area. Electrical cables and fiber optic cables extending through plenum areas are governed by special provisions of the National Electric Code ("NEC").

The cable standards are increasing the required maximum frequencies supported by communications cables from 100-200 MHz to 250-1000 MHz. Recently, 40 Gbts transmission of data over copper cables has been proposed. The maximum upper frequency of a cable is that frequency at which the attenuation/cross-talk ratio ("ACR") is approximately equal to 1. Since signal strength decreases with frequency and data attenuation and cross-talk increases with frequency, the design of cables that would support high frequencies poses a significant challenge. This is especially true since many conventional designs for cable components, e.g., fillers and spacers, may not provide sufficient cross-talk isolation at the higher frequencies.

The selection of materials for forming cables that can support high frequencies and concurrently exhibit favorable flame and smoke characteristics can be challenging. Accordingly, there remains a need for enhanced materials for use in fabricating various components of communications cables such that the cables would exhibit desired properties, e.g., for high-speed transmission of data.

SUMMARY OF THE INVENTION

In one aspect, the present invention relates to compositions comprising a fluoropolymer and a plastic polymer (where the composition is herein also referred to as a fluoropolymer alloy), which can be used, for example, for fabricating various components of a cable, e.g., a telecommunications cable. It has been discovered that chemical foaming agents, and in particular, talc and talc derivatives can be employed to foam such polymers, thus allowing great flexibility in forming components of cables that can meet stringent cabling standards. The teachings of the invention are applicable, without limitation, to forming copper cables, fiber optic cables, and cables that include both copper conductors and optical fibers, as well as PoE (Power over Ethernet) cables.

One aspect of the invention relates to the foaming of a fluoropolymer alloy, which can be in the form of a pellet or a so-called foamable pellet via an extrusion process. The foaming of the composition advantageously lowers the combustible footprint of the entire cable, e.g., by 20% to 50%.

As discussed in more detail below, the fluoropolymer alloys of the present invention allow fabricating separators, wire insulation and cable jackets, among others, which can be used to form cables that meet the most stringent flammability and smoke generation requirements. Further, the fluoropolymer alloys of the present invention can be employed to form blown tubing for optical fibers.

In one aspect, a composition is disclosed, which includes a fluoropolymer and a plastic polymer mixed with the fluoropolymer, where the plastic polymer is miscible in the fluoropolymer. In some embodiments, the composition can be in the form of solid pellets. A variety of fluoropolymers and plastic polymers can be employed. By way of example, in some embodiments, the fluoropolymer can be a perfluoropolymer. Some examples of suitable fluoropolymers include, without limitation, polytetrafluoroethylene (PTFE), fluorinated ethylene propylene (FEP), ethylene tetrafluoroethylene (ETFE), perfluoro methyl alkoxy (MFA), perfluoroalkoxy alkanes (PFA), ethylene chlorotrifluoroethylene (ECTFE), polyvinylidene fluoride (PVDF), and a combination thereof.

Some examples of suitable plastic polymers include, without limitation, polyether ether ketone (PEEK), polyphenylene sulfide (PPS), polyphenylsulfone (PPSU), polyether sulfones (PES/PESU), polyarylsulfones (PSU), polyetherketoneketone (PEKK), polypropylene (PP), low-density polyethylene (LDPE), Noryl (blend of PPO polyphenylene ether resin and polystrene), polymethyl methacrylate (PMMA), styrene-ethylene/butylene-styrene (Kraton® SEBS), polyester elastomer (HYTREL®), acrylonitrile butadiene styrene (ABS), polycaprolactam (Nylon 6), polycarbonate (PC), polyolefin grafted nylon-6 (Apolhya® LP2), polystyrene (PS), and polyvinyl chloride (PVC).

In some embodiments, the plastic polymer is amorphous. In some embodiments, the composition includes a plastic polymer that has a specific gravity less than a specific gravity of the fluoropolymer of that composition.

In some embodiments, a composition comprising a mixture of a fluoropolymer and a plastic polymer according to the present teachings can exhibit a tensile strength greater than a tensile strength of a composition formed solely of the fluoropolymer. By way of example, in some embodiments, a composition according to the present teachings can exhibit a tensile strength of greater than about 2,500 psi, or greater than about 3,000 psi, or greater than about 3,500 psi, and preferably greater than about 4,000 psi.

In some embodiments, the weight concentration of the fluoropolymer in the composition is at least about 50%. For example, the fluoropolymer can have a concentration in a range of about 50 to about 90 weight percent of the composition. By way of example, in some embodiments, the fluoropolymer has a concentration in a range of about 60 to about 80 weight percent of the composition. In some embodiments, the fluoropolymer has a concentration in a range of about 50 to about 75 weight percent of the composition.

In some embodiments, the weight concentration of the plastic polymer in the composition is in a range of about 10 to about 50 percent. By way of example, the plastic polymer can have a concentration in a range of about 20 to about 40 weight percent, or about 25 to about 35 weight percent of the composition.

In certain embodiments, the composition includes fluorinated ethylene propylene (FEP) as the fluoropolymer and polycarbonate (PC) as the plastic polymer.

In certain embodiments, the composition includes polyvinylidene fluoride (PVDF) as the fluoropolymer and polymethyl methacrylate (PMMA) as the plastic polymer.

In one aspect, a composition is disclosed, which includes a blend of a fluoropolymer and a plastic polymer as well as talc (or a talc derivative) and a citrate compound. The combination of the talc and the citrate compound can function as a chemical foaming agent. In some such embodiments, the talc (or talc derivative) can have a weight concentration in a range of about 1% to about 25%, such as a concentration of about 3% to about 20%, or in a range of about 5% to about 15%, or in a range of about 7% to about 10%. Further, the weight concentration of the citrate compound can be, for example, in a range of about 0.01% to about 1%, or in a range of about 0.02% to about 0.9%, or in a range of about 0.03% to about 0.8%, or in a range of about 0.04% to about 0.7%, or in a range of about 0.05% to about 0.6%, or in a range of about 0.06% to about 0.5%. In some such embodiments, the weight concentration of the base polymer (i.e., a blend of a fluoropolymer and a plastic polymer) can be, for example, in a range of about 40% to about 95%, e.g., in a range of about 50% to about 85%, or in a range of about 60% to about 75%. In some such embodiments, the citrate compound can be a citrate salt. Some suitable examples of citrate salts include, without limitation, calcium citrate, potassium citrate, zinc citrate and combinations thereof.

In a related aspect, an article is disclosed, which includes a fluoropolymer, and a plastic polymer mixed with the fluoropolymer, where the plastic polymer is miscible in the fluoropolymer. By way of example, the article can be any of a solid separator, a tape, or an insulation for an electrical conductor. The article can be used, for example, as one of the components of a telecommunications cable. By way of example, the fluoropolymer and the plastic polymer can be one of those discussed above. In some embodiments, the article can be foamed, i.e., it can include a plurality of cellular structures distributed therein. In some embodiments, such a foamed article can exhibit a foaming level, e.g., in a range of about 10% to about 50%, such as in a range of about 20% to about 40%.

In another aspect, a foamable composition is disclosed, which includes a fluoropolymer, a plastic polymer mixed with the fluoropolymer, and a chemical foaming agent, where the plastic polymer is miscible in the fluoropolymer. In some embodiments, the plastic polymer is amorphous. In some embodiments, the plastic polymer has a specific gravity less than a specific gravity of said fluoropolymer.

In some embodiments, the foaming agent includes talc or a talc derivative. In some embodiments, the talc or talc derivative constitutes the only foaming agent present in the foamable composition. In other embodiments, in addition to talc or talc derivative, the composition can include other chemical foaming agents. Some examples of such foaming agents include $MgCO_3$, $CaCO_3$, Dolomite, Brucite, Vermiculite, or Calcite. In some embodiments, the foamable composition can include one or more foaming agents as well as one or more nucleating agents. Some examples of nucleating agents include, for example, Boron Nitride, PTFE, Calcium Carbonate, Magnesium Carbonate, Graphite, Carbon Black, Titanium Oxide, or Zinc Oxide. In many embodiments, the talc or the talc derivative functions as both a nucleating and a foaming agent, i.e., it functions as an active nucleating agent.

In some embodiments of the foamable composition, the chemical foaming agent, e.g., the talc, talc derivative, $MgCO_3$, $CaCO_3$, Dolomite, Brucite, Vermiculite, or Calcite, comprises about 1% to about 70% by weight of the foamable composition. By way of example, the talc or the talc derivative can comprise about 1% to about 60%, or about 1% to about 50%, or about 1% to about 40%, or about 1% to about 30%, or about 1% to about 20%, or about 1% to about 10%, or about 1% to about 5%, or about 1% to about 3%, or about 1% to about 2% by weight of the foamable composition.

In some embodiment of the foamable composition, the chemical foaming agent can be a combination of talc (or talc derivative) and a citrate compound. By way of example, the weight concentration of talc (or talc derivative) in the composition can be in a range of about 1% to about 25%, and the weight concentration of the citrate compound can be in a range of about 0.01% to about 1%. Some examples of suitable citrate compounds include, without limitation, citrate salts, such as calcium citrate, potassium citrate, zinc citrate and combinations thereof.

In embodiments described herein, the foamable fluoropolymer alloy composition exhibits a tensile strength greater than a tensile strength of the fluoropolymer. In some embodiments, the foamable fluoropolymer alloy composition has a tensile strength of greater than 4,000 psi. In some embodiments, the foamable fluoropolymer alloy composition has a tensile strength of greater than 3,500 psi. In some embodiments, the foamable fluoropolymer alloy composition has a tensile strength of greater than 6,300 psi. In some embodiments, the foamable fluoropolymer alloy composition has a tensile strength of greater than 2,500 psi.

In some embodiments, the fluoropolymer component of the foamable composition comprises at least about 40 weight percent of the composition. By way of example, in some embodiments, the weight concentration of the fluoropolymer component of the foamable composition can be in a range of about 40 percent to about 80 percent, or in a range of about 50 percent to about 70 percent, or in range of about 60 percent to about 70 percent of the foamable composition.

A foamable composition according to the present teachings can include a variety of different fluoropolymers. For example, the fluoropolymer can be a perfluoropolymer. Some examples of suitable fluoropolymers include, without limitation, polytetrafluoroethylene (PTFE), fluorinated ethylene propylene (FEP), ethylene tetrafluoroethylene (ETFE), perfluoro methyl alkoxy (MFA), perfluoroalkoxy alkanes (PFA), ethylene chlorotrifluoroethylene (ECTFE), and polyvinylidene fluoride (PVDF).

Further, the foamable composition can include a variety of different plastic polymers. Some examples of suitable plastic polymers include, without limitation, polyether ether ketone (PEEK), polyphenylene sulfide (PPS), polyphenylsulfone (PPSU), polyether sulfones (PES/PESU), polyarylsulfones (PSU), polyetherketoneketone (PEKK), polypropylene (PP), low-density polyethylene (LDPE), Noryl (blend of PPO polyphenylene ether resin and polystrene), polymethyl methacrylate (PMMA), styrene-ethylene/butylene-styrene (Kraton® SEBS), polyester elastomer (HYTREL®), acrylonitrile butadiene styrene (ABS), polycaprolactam (Nylon 6), polycarbonate (PC), polyolefin grafted nylon-6 (Apolhya® LP2), polystyrene (PS), and polyvinyl chloride (PVC).

In some embodiments of a foamable composition according to the present teachings, the plastic polymer has a concentration in a range of about 10 to about 50 weight percent of the composition. By way of example, the plastic polymer component can have a concentration in a range of about 20 to about 40 weight percent, or about 25 to about 35 weight percent of the composition.

In certain embodiments, the foamable composition includes fluorinated ethylene propylene (FEP) as the fluoropolymer, polycarbonate (PC) as the plastic polymer, and talc or a talc derivative as the chemical foaming agent.

In certain embodiments, the foamable composition includes polyvinylidene fluoride (PVDF) as the fluoropolymer, polymethyl methacrylate (PMMA) as the plastic polymer, and talc or a talc derivative as the chemical foaming agent.

In some embodiments, the foamable composition including talc or talc derivative is melt processable at an elevated temperature that is sufficient to cause the melting of the composition and to cause the talc or talc derivative to foam, i.e., to cause decomposition of the talc or talc derivative so as to generate gas for foaming the composition. For example, in some embodiments, the foamable composition is melt processable at a temperature of at least about 600° F. In another embodiment, the foamable composition is melt processable at a temperature of at least about 610° F. In another embodiment, the foamable composition is melt processable at a temperature of at least about 620° F. In another embodiment, the foamable composition is melt processable at a temperature of at least about 630° F. In another embodiment, the foamable composition is melt processable at a temperature of at least about 640° F. In another embodiment, the foamable composition is melt processable at a temperature of at least about 650° F. In another embodiment, the foamable composition is melt processable at a temperature of at least about 660° F.

In a related aspect, a foamed article is disclosed, which includes a fluoropolymer, a plastic polymer (which is miscible in the fluoropolymer), and a plurality of cellular structures (herein also referred to as foamed cells) distributed throughout the article. The fluoropolymer and the plastic polymer can be one of those discussed above. In some embodiments, the cellular structures have a maximum dimension (e.g., a diameter) in a range of about 0.0005 inches to about 0.003 inches. In some embodiments, the foamed article can comprise foamed cells having a maximum dimension (e.g., a diameter) in a range of about 0.0005 inches to about 0.003 inches. In some cases, the foamed cells can have an average diameter of about 0.0008 inches. The foamed cells can have a closed cell structure, an open cell structure, or a combination thereof. In some embodiments, a majority of the foamed cells (e.g., greater than 50%) have a closed cell structure. For example, greater than about 50%, greater than about 60%, greater than about 70%, greater than about 80% or greater than about 90% of the foamed cells can have a closed cell structure. Another embodiment includes using talc as chemical foaming agent to form uniform cell structures in the foamed or blown composition. The foamed article can be, without limitation, any of a separator, a tape, or insulation of an electrical conductor, or a jacket, used in a telecommunications cable.

In one aspect, a foamed article is disclosed, which is made by a process comprising heating a foamable composition according to the present teachings, such as those discussed above, to an elevated temperature (e.g., at least about 600° F.) sufficient to cause melting of the foamable composition and causing the decomposition of a chemical foaming agent, e.g., talc, talc derivative, $MgCO_3$, $CaCO_3$, Dolomite, Brucite, Vermiculite, or Calcite, of the composition. The melted composition can be extruded to form the foamed article. In some embodiments, the fluoropolymer is a perfluoropolymer. In some embodiments, the fluoropolymer can be any of polytetrafluoroethylene (PTFE), fluorinated ethylene propylene (FEP), ethylene tetrafluoroethylene (ETFE), perfluoro methyl alkoxy (MFA), perfluoroalkoxy alkanes (PFA), ethylene chlorotrifluoroethylene (ECTFE), and polyvinylidene fluoride (PVDF). In some embodiments, the plastic polymer can be any of polyether ether ketone (PEEK), polyphenylene sulfide (PPS), polyphenylsulfone (PPSU), polyether sulfones (PES/PESU), polyarylsulfones (PSU), polyetherketoneketone (PEKK), polypropylene (PP), low-density polyethylene (LDPE), Noryl (blend of PPO polyphenylene ether resin and polystrene), polymethyl methacrylate (PMMA), styrene-ethylene/butylene-styrene (Kraton® SEBS), polyester elastomer (HYTREL®), acrylonitrile butadiene styrene (ABS), polycaprolactam (Nylon 6), polycarbonate (PC), polyolefin grafted nylon-6 (Apolhya® LP2), polystyrene (PS), and polyvinyl chloride (PVC).

In one embodiment, the above foamed article is formed by heat processing a foamable composition according to the present teachings, which comprises talc or talc derivative at a concentration of about 1% to about 40% by weight of the foamable composition. In another embodiment, the talc or the talc derivative comprises about 5% to about 30%, or about 10% to about 20%, or about 1% to about 3% by weight of the foamable composition. In an embodiment, the talc or the talc derivative constitutes the only foaming agent in the foamable composition.

In one embodiment, a foamed article according to the present teachings is formed by heat processing a foamable composition according to the present teachings, which comprises a mixture of a fluoropolymer, a plastic polymer, talc (or talc derivative) and a citrate compound to a temperature sufficient to cause decomposition of at least the talc (or talc derivative) so as to generate a gas for foaming the composition. By way of example, the composition can be heated to a temperature of at least about 600 F, or at least about 610 F, or at least about 620 F, or at least about 630 F or at least about 640 F. In some embodiments, the heated composition can be extruded to form a foamed article, such as a foamed separator for use in a communications cable. As discussed above, the citrate compound can be, for example, a citrate salt, such as calcium citrate, potassium citrate, zinc citrate and combinations thereof. The combination of the talc (or talc derivative) and the citrate compound can advantageously allow obtaining a foamed article exhibiting an enhanced foaming level, e.g., a foaming level in a range of about 40% to about 70%, e.g., 60%.

In some embodiments, a variety of organic and inorganic additives can be used to improve the electrical and/or flammability and smoke generation of the articles, including foamed articles, fabricated according to the various embodiments of the present teachings. By way of example, an additive can enhance the fire retardancy and/or smoke suppressant characteristics of the articles described herein. Some examples of such additives include nano-composites of clay and other inorganics such as ZnO, $TiO_2$, and nitrogen phosphorus based fire retardants. In some embodiments, the additives can be in the form of nano-sized particles. Other examples include insulative or semi-conductive Buckminster fullerenes and doped fullerenes of the $C_{60}$ family, nanotubes of the same and the like, which offer unique properties that allow for maintaining electrical integrity as well as providing the necessary reduction in flame retardance and smoke suppression.

In an embodiment of the foamed article, the foamed article has a tensile strength of about 2,500 psi to about 10,000 psi. Further, in an embodiment, the foamed article has a specific gravity of about 0.60 to about 1.45 $g/cm^3$.

In one aspect, the present teachings are directed to a communications cable, which comprises a separator providing a plurality of channels, each of which can receive one or more transmission media, such as electrical conductor(s) and/or optical fiber(s). Typically, a twisted pair of conductors is disposed in each of the channels. In some embodiments, there are 1, 2, 3, 4, 5, 6 or more channels. The electrical conductor can include an electrically conductive core (e.g., an electrically conductive element formed, e.g., of copper) and an insulation that at least partially surrounds the conductive core. In some embodiments, the separator can be formed of a composition according to the present teachings, such as the compositions discussed above. For example, the separator can be formed of a fluoropolymer and a plastic polymer mixed with the fluoropolymer, where the plastic polymer is miscible in the fluoropolymer.

In some embodiments of the communications cable, the separator can have a foamed structure. For example, the separator can have a cellular structure characterized by a plurality of cells (e.g., filled with a gas such as air) distributed therein. Such cellular structure can improve the electrical and/or thermal properties of the foamed article. By way of example, the separator can exhibit a foaming level in a range of about 10% to about 80%, e.g., in a range of about 15% to about 70%, or in a range of about 20% to about 60%, or in a range of about 25% to about 50%, or in a range of about 30% to about 40%. In some embodiments, the foaming level is about 10%, about 15%, about 20%, about 25%, about 30%, about 35%, about 40%, about 45%, about 50%, about 55%, about 60%, about 65%, about 70%, about 75%, or about 80%. In some embodiments, such foamed structures can exhibit a tensile strength of at least about 2,500 psi, e.g., in a range of about 2,500 psi to about 4,000 psi.

In some embodiments, the separator can include an additive distributed therein. In some cases, the additive can be a smoke suppressant additive and/or flame retardant additive. By way of example, the additive can be any of the molybdate derivatives, such as molyoxide, ammonium octamolybdate (AOM), calcium molybdate and zinc molybdate, metal oxides, such as Ongard II, zinc and other oxides, borates, such as zinc borate and meta borate, stannates, such as zinc hydroxyl stannates and zinc stannates, nitrogen-phosphorus, phosphorus based esters, such as triaryl, tri aklkyl, and/or magnesium hydrates/carbonates, such as magnesium hydroxide, magnesium carbonate, antimony trioxide, decachlorodiphenyloxide, alumina trihydrate, and calcium carbonate.

In some embodiments, one or more electrical conductors of the communications cable can have an insulation, which at least partially surrounds the electrically conductive core(s) of the electrical conductor(s), where the insulation is formed using the compositions disclosed herein. By way of example, the insulation can include a fluoropolymer, and a plastic polymer mixed with the fluoropolymer, where the plastic polymer is miscible in the fluoropolymer.

In some such embodiments, the insulation can have a foamed structure, while in other embodiments the insulation is not foamed. In some embodiments, the insulation can include a multi-layer (e.g., a bi-layer) structure in which different layers can comprise different polymers. In some such embodiments, one layer can have a solid (non-foamed) structure and an adjacent layer can have a foamed structure. In another embodiment, both layers can have a foamed structure. By way of example, one layer can be formed as a solid structure comprising fluorinated ethylene propylene and polycarbonate, and an adjacent layer can comprise polyvinylidene fluoride and polymethyl methacrylate and can have a foamed structure. For example, the insulation can have a bi-layer structure in which an inner layer (i.e., the layer in contact with the conductive core of the electrical conductor) is a solid layer and an outer layer (i.e., a layer disposed on the inner layer) is a foamed layer. Alternatively, the inner layer can be a foamed layer and the outer layer can be a solid layer. Yet in other embodiments, both the inner and the outer layers are foamed layers.

In some embodiments, the inner layer of the insulation can comprise a foamed layer with a foaming level of about 10% to about 80%, e.g., in a range of about 15% to about 70%, or in a range of about 20% to about 60%, or in a range of about 25% to about 50%, or in a range of about 30% to about 40%. In some embodiments, the foaming level is about 10%, about 15%, about 20%, about 25%, about 30%, about 35%, about 40%, about 45%, about 50%, about 55%, about 60%, about 65%, about 70%, about 75%, or about 80%.

In some embodiments, the insulation can have a bi-layer structure in which any of the inner and/or the outer layer comprises at least one additive. In some embodiments, the additive can be a smoke suppressant and/or flame retardant additive. For example, the additive can be any of molybdate derivatives, such as molyoxide, ammonium octamolybdate (AOM), calcium molybdate and zinc molybdate, metal oxides, such as Ongard II, zinc and other oxides, borates, such as zinc borate and meta borate, stannates, such as zinc hydroxyl stannates and zinc stannates, phosphorus based esters, such as triaryl, tri aklkyl, and ADP, and magnesium hydrates/carbonates, such as magnesium hydroxide, magnesium carbonate, and antimony trioxide, decachlorodiphenyloxide, and alumina trihydrate.

In some embodiments, the communications cable can further include a jacket that at least partially encloses the separator and one or more transmission media, such as electrical conductors, that are disposed in the channels provided by the separator. In some embodiments, the jacket can comprise a fluoropolymer, and a plastic polymer mixed with the fluoropolymer, where said plastic polymer is miscible in the fluoropolymer. The fluoropolymers and plastic polymers discussed above can be employed. In some embodiments, the jacket is solid while in others the jacket has a foamed structure.

Further understanding of various aspects of the invention can be obtained by reference to the following detailed description in conjunction with the associated drawings, which are described briefly below.

BRIEF DESCRIPTION OF THE DRAWINGS

Features and advantages of the claimed subject matter will be apparent from the following description of embodiments consistent therewith, which the description should be considered in conjunction with the accompanying drawings.

DETAILED DESCRIPTION OF THE INVENTION

Figure 1A:
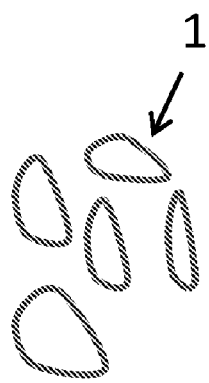
FIG. 1A schematically depicts a plurality of pellets according to an embodiment of the invention.

In some aspects, the present invention provides polymeric compositions, articles formed using such polymeric compositions as well as processes for fabricating the polymeric compositions and the articles. In some embodiments, the polymeric compositions allow fabricating foamed articles (for example, foamed separators for use in telecommunications cables), which exhibit a high foaming level as well as good mechanical strength. In particular, it has been discovered that by mixing a fluoropolymer with a plastic polymer, compositions can be formed that exhibit a variety of useful properties. For example, a chemical foaming agent, such as talc (or talc derivative) or a combination of talc (or talc derivative) and a citrate compound, can be incorporated in such compositions to form foamable compositions, which allow fabricating foamed articles exhibiting a high foaming rate as well as excellent mechanical strength. For example, the foamed articles fabricated by using the foamable compositions of the invention allow achieving light weighting without compromising mechanical strength. By way of example, a foamed article according to the present invention can exhibit a foaming level in range of about 10% to about 80% while concurrently exhibiting a tensile strength of at least about 2500 psi, e.g., in a range of about 2500 psi to about 4000 psi.

Certain exemplary embodiments will now be described to provide an overall understanding of the principles of the structure, function, manufacture, and use of the compositions, devices, and methods of producing and making compositions and articles disclosed herein. One or more examples of these embodiments are illustrated in the accompanying drawings. Those skilled in the art will understand that the cables, cable components and methods of making the same specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

So that the invention may more readily be understood, certain terms are first defined.

As used herein, the terms "about" or "approximately" for any numerical values or ranges indicate a suitable dimensional tolerance that allows the composition, part, or collection of elements to function for its intended purpose as described herein. These terms indicate at most a ±5% variation about a central value.

The term "cross-talk" is used herein consistent with its common usage in the art to refer to electromagnetic interference between conductors, cables, or other electronic circuit elements.

The term "talc" is used herein consistent with its common usage in the art to refer to any natural or synthetic minerals with the chemical formula $MgSiOH$, $H_2Mg_3(SiO_3)_4$, $Mg_3Si_4O_{10}(OH)_2$, $3MgO.4SiO_2.H_2O$, or $MgOH.H_2O.SiOH$. The term "talc derivative" is used herein to refer to "talc" that includes additives or impurities such as, for example, dolomite (a magnesium calcium carbonate), chlorite (a magnesium aluminum silicate), magnesite (a magnesium carbonate), and calcium carbonate. Additives and/or impurities can be present as one or more minor components with talc, for example, each additive or impurity can comprise less than 1% (by weight), less than 2%, less than 3%, less than 4%, less than 5%, less than 6%, less than 7%, less than 8%, less than 9%, or less than 10% or more.

A "talc derivative" can also include other magnesium compounds, such as, for example, hydrotalcite. Hydrotalcite ($Mg_6Al_2CO_3(OH)_{16}.4(H_2O)$) can be natural or synthetic. An example of a synthetic hydrotalcite can be found in U.S. Pat. No. 5,075,087, the entirety of which is hereby incorporated by reference. Hydrotalcite mineral data can be found online, for example at: http://webmineral.com/data/Hydrotalcite.shtml. Hydrotalcite is a layered double hydroxide whose name is derived from its resemblance with talc and its high water content. The layers of the structure may stack in different ways, to produce a 3-layer rhombohedral structure (3R Polytype), or a 2-layer hexagonal structure (2H polytype). The two polytypes are often intergrown. The carbonate anions that lie between the structural layers are weakly bound, so hydrotalcite has anion exchange capabilities.

As used herein, the term "melt-processable" means that the polymer can be processed (i.e. fabricated into shaped articles, insulation(s), jacket coatings, films, fibers, tubes, wire coatings and the like) by conventional melt extruding, injecting or casting means.

The term "thermoplastic" as used herein, refers to polymers that are pliable or moldable above a specific temperature and return to a solid state upon cooling. These polymers have the property of becoming soft when they are heated and of becoming rigid again when they are cooled, without undergoing an appreciable chemical change. Such a definition may be found, for example, in the encyclopedia called "Polymer Science Dictionary", Mark S. M. Alger, London School of Polymer Technology, Polytechnic of North London, UK, published by Elsevier Applied Science, 1989.

As used herein, the term "elastomer" is intended to designate a true elastomer or a polymer resin serving as a base constituent for obtaining a true elastomer. True elastomers are defined by the ASTM, Special Technical Bulletin, No. 184 standard as materials capable of being stretched, at room temperature, to twice their intrinsic length and which, once they have been released after holding them under tension for 5 minutes, return to within 10% of their initial length in the same time.

As used herein, the term "active nucleating agent" is intended to denote a compound which acts both as a nucleating agent, as above described and, at the same time, participates in blowing, by at least partially decomposing to yield gaseous components.

As used herein, the term "foamed article" refers to an article of manufacture that includes a plurality of cellular structures.

As used herein, "foaming level" is the ratio of the volume of cells in a cellular structure, e.g. a cellular separator, relative to the total volume of the structure.

As used herein, the term "fluoropolymer" refers to a carbon-based polymer with one or more carbon-fluorine bonds.

As used herein, the term "plastic polymer" refers to a polymer that is malleable at elevated temperatures, e.g., at a temperature above its glass transition temperature, and hence can be molded into solid objects. There are two types of plastic polymers: (1) thermoplastic polymers and (2) thermosetting polymers. Thermoplastic plastic polymers are plastic polymers that do not undergo chemical change in their composition when heated to elevated temperatures, e.g., temperature exceeding their melting point or glass transition temperature, and hence can be molded many times via cycles of heating and cooling. Thermosetting plastic polymers undergo irreversible chemical change when heated to elevated temperatures, e.g., temperatures exceeding their glass transition temperature. As such, thermosetting plastic polymers can be molded once. An "amorphous plastic polymer" refers to a plastic polymer that has a partially or a completely amorphous, rather than crystalline, molecular structure, such as polystyrene.

As used herein, a plastic polymer is miscible in a fluoropolymer if it is capable of being mixed with the fluoropolymer without separation of the two phases, e.g., to form a homogeneous mixture of the plastic polymer and the fluoropolymer.

Pellet Compositions

In one aspect, the invention is directed to a fluoropolymer alloy composition in the form of pellets. FIG. 1A schematically depicts a plurality of pellets 1, each of which includes a fluoropolymer and a plastic polymer mixed with the fluoropolymer, where the plastic polymer is miscible in the fluoropolymer. In some embodiments, the fluoropolymer is a perfluoropolymer. In some embodiments, the fluoropolymer can be any of polytetrafluoroethylene (PTFE), fluorinated ethylene propylene (FEP), ethylene tetrafluoroethylene (ETFE), perfluoro methyl alkoxy (MFA), perfluoroalkoxy alkanes (PFA), ethylene chlorotrifluoroethylene (ECTFE), polyvinylidene fluoride (PVDF), and combinations thereof. Some examples of plastic polymers include polyether ether ketone (PEEK), polyphenylene sulfide (PPS), polyphenylsulfone (PPSU), polyether sulfones (PES/PESU), polyarylsulfones (PSU), polyetherketoneketone (PEKK), polypropylene (PP), low-density polyethylene (LDPE), Noryl (blend of PPO polyphenylene ether resin and polystrene), polymethyl methacrylate (PMMA), styrene-ethylene/butylene-styrene (Kraton® SEBS), polyester elastomer (HYTREL®), acrylonitrile butadiene styrene (ABS), polycaprolactam (Nylon 6), polycarbonate (PC), polyolefin grafted nylon-6 (Apolhya® LP2), polystyrene (PS), and polyvinyl chloride (PVC). In some embodiments, the plastic polymer is amorphous. In some embodiments, a pellet includes a plastic polymer having a specific gravity less than a specific gravity of the fluoropolymer of the pellet.

In embodiments described herein, the fluoropolymer component of each of the solid pellets 1 includes at least about 50 weight percent of the composition. In some embodiments, the fluoropolymer component has a concentration in a range of about 50 to about 90 weight percent of a pellet. By way of example, the weight concentration of the fluoropolymer component of a pellet can be in a range of about 60% to about 80%, or in a range of about 50% to about 70%.

In some embodiments, the plastic polymer component has a concentration in a range of about 10 to about 50 weight percent of the pellet. In some embodiments, the plastic polymer component has a weight concentration in a range of about 20% to about 45% of the pellet. In some embodiments, the plastic polymer component has a concentration in a range of about 15 to about 40 weight percent of the pellet. In some embodiments, the plastic polymer component has a weight concentration in a range of about 10% to about 35% of the pellet.

In certain embodiments, each of the solid pellets 1 includes fluorinated ethylene propylene (FEP) as the perfluoropolymer and polycarbonate (PC) as the plastic polymer.

In certain embodiments, the solid fluoropolymer alloy composition comprises polyvinylidene fluoride (PVDF) as the perfluoropolymer and polymethyl methacrylate (PMMA) as the plastic polymer.

Figure 1B:
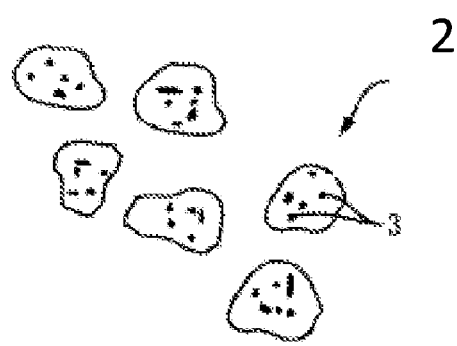
FIG. 1B schematically depicts a plurality of foamable pellets according to an embodiment of the invention.

With reference to FIG. 1B, in some embodiments, the invention provides foamable pellets 2, each of which includes a fluoropolymer mixed with a plastic polymer, which is miscible with the fluoropolymer, and a chemical foaming agent 3 distributed through the pellets. In some embodiments, the chemical foaming agent can be talc or a talc derivative. In some embodiments, the plastic polymer is amorphous. In some embodiments, the plastic polymer has a specific gravity less than a specific gravity of said fluoropolymer. In some embodiments, the chemical foaming agent 3 can be a mixture of talc (or talc derivative) and a citrate compound, e.g., a citrate salt such as calcium citrate, potassium citrate, zinc citrate and combinations thereof.

In some embodiments, the fluoropolymer component of the foamable pellets 2 include at least about 40 weight percent of the pellets. By way of example, in some embodiments, the weight concentration of the fluoropolymer component of the foamable pellets can be in a range of about 40 percent to about 80 percent, or in a range of about 50 percent to about 70 percent, or in a range of about 60 percent to about 70 percent of the pellets.

In some embodiments, the fluoropolymer component of the foamable pellets 2 can be any of the fluoropolymers listed above, such as polytetrafluoroethylene (PTFE), fluorinated ethylene propylene (FEP), ethylene tetrafluoroethylene (ETFE), perfluoro methyl alkoxy (MFA), perfluoroalkoxy alkanes (PFA), ethylene chlorotrifluoroethylene (ECTFE), and polyvinylidene fluoride (PVDF).

In some embodiments of the foamable pellets 2, the concentration of the plastic polymer in a foamable pellet can be, for example, in a range of about 10 to about 50 weight percent. By way of example, the plastic polymer component can have a concentration in a range of about 20 to about 40 weight percent, or about 25 to about 35 weight percent of the composition.

The foamable pellets 2 can include a variety of different plastic polymers, such as those discussed above. By way of example, the plastic polymer can be any of polyether ether ketone (PEEK), polyphenylene sulfide (PPS), polyphenylsulfone (PPSU), polyether sulfones (PES/PESU), polyarylsulfones (PSU), polyetherketoneketone (PEKK), polypropylene (PP), low-density polyethylene (LDPE), Noryl (blend of PPO polyphenylene ether resin and polystrene), polymethyl methacrylate (PMMA), styrene-ethylene/butylene-styrene (Kraton® SEBS), polyester elastomer (HYTREL®), acrylonitrile butadiene styrene (ABS), polycaprolactam (Nylon 6), polycarbonate (PC), polyolefin grafted nylon-6 (Apolhya® LP2), polystyrene (PS), and polyvinyl chloride (PVC).

In some embodiments, the pellets 2 include talc or a talc derivative as the foaming agent. In some such embodiments, the talc or talc derivative constitutes the only foaming agent present in the foamable pellets. In other embodiments, in addition to talc or a talc derivative, other chemical foaming agents, such as $MgCO_3$, $CaCO_3$, Dolomite, Brucite, Vermiculite, or Calcite can be present in the foamable pellets. In some embodiments, in addition to talc or a talc derivative, the pellets 2 can further include a citrate compound, such as a citrate salt (e.g., calcium citrate, potassium citrate, zinc citrate and combinations thereof).

In some embodiments of the foamable pellets, the chemical foaming agent, e.g., talc or talc derivative, has a weight concentration of about 1% to about 50% of the foamable pellets. By way of example, the weight concentration of the chemical foaming agent can be in a range of about 2% to about 40%, or in a range of about 3% to about 30%, or in a range of about 5% to about 20%, e.g., about 10%, of foamable pellets.

In certain embodiments, the foamable pellets 2 comprise fluorinated ethylene propylene (FEP) as the fluoropolymer, polycarbonate (PC) as the plastic polymer, and talc or talc derivative as the foaming agent.

In certain embodiments, the foamable pellets 2 comprise polyvinylidene fluoride (PVDF) as the fluoropolymer, polymethyl methacrylate (PMMA) as the plastic polymer, and talc as the foaming agent.

In some embodiments, the foamable pellets are melt processable at an elevated temperature that is sufficient to cause the melting of the pellets and to cause one or more chemical foaming agents present in the pellets, such as talc or talc derivative, to foam, i.e., to cause decomposition of the foaming agent so as to generate gas for foaming the composition. For example, in some embodiments, the foamable pellets are melt processable at a temperature of at least about 600° F., or at a temperature of at least about 610° F., or at a temperature of at least about 620° F., or at a temperature of at least about 630° F., or at a temperature of at least about 640° F., or at a temperature of at least about 650° F., or at a temperature of at least about 660° F.

Separators

Figure 2A:
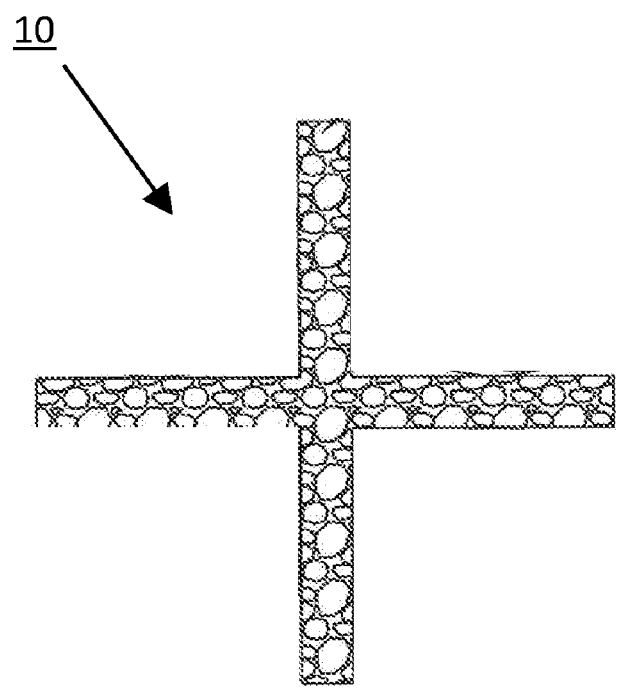
FIG. 2A depicts a cross-sectional view of a foamed separator according to an embodiment of the invention.
Figure 2B:
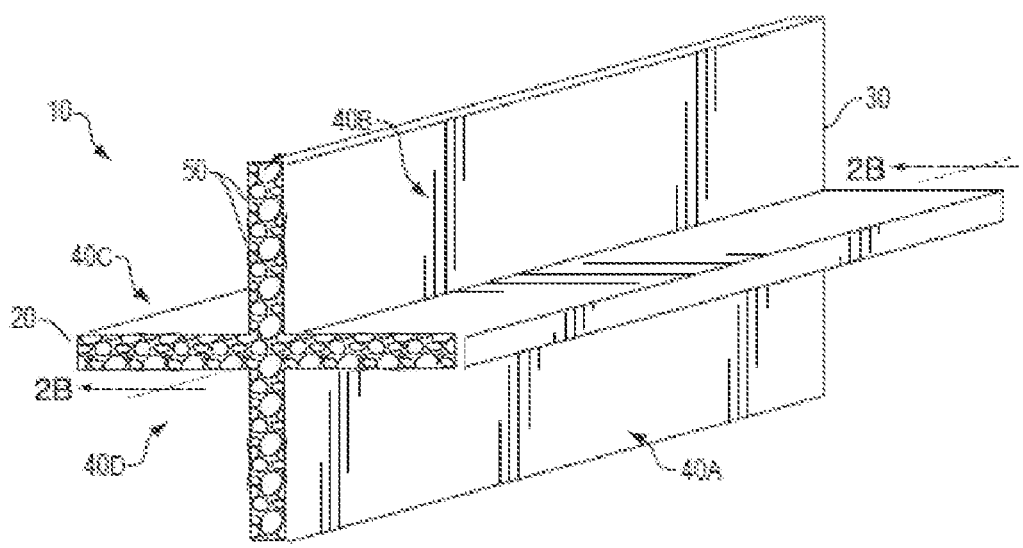
FIG. 2B depicts a longitudinal view of the foamed separator of FIG. 2A.

In one aspect, the invention provides separators, e.g., for use in telecommunications cables, that provide shielding of electromagnetic radiation. In some embodiments such separators can be formed into predefined shapes, e.g., by extrusion via a die. For example, a die with a cross-shaped opening can be used to form an elongated separator that has an elongated cross-shaped form. By way of example, FIGS. 2A and 2B schematically depict a pre-formed foamed separator 10 according to one embodiment of the invention that has an elongated cross-shaped form, which extends from a proximal end 20 to a distal end 30. The separator 10 provides four elongated channels 40A, 40B, 40C, 40D, in each of which one or more transmission media, such as electrical conductors, e.g., a twisted-pair wire, can be disposed. In many embodiments, the separator 10 is particularly effective in lowering the cross-talk in a frequency range of about 1 MHz to about 40 GHz, or in a range of about 1 MHz to about 10 GHz, or in a range of about 1 MHz to about 2 GHz, or in a range of about 1 MHz to about 1.5 GHz between the conductors disposed in neighboring channels. In other embodiments, the separator 10 is particularly effective in lowering cross-talk in a frequency range of about 500 MHz to about 1 GHz, in a range of about 500 MHz to about 10 GHz, in a range of about 1 MHz to about 40 GHz, in a range of about 1 MHz to about 10 GHz, in a range of about 1 MHz to about 2 GHz, or in a range of about 1 MHz to about 1.5 GHz. These frequency ranges are particularly useful for separators in cables used for high speed transmission of information. For example, to transmit information through a cable at a higher bit rate, a higher bandwidth is required which, in turn, requires transmission of signals at higher frequencies.

With continued reference to FIGS. 2A and 2B, the separator 10 includes a fluoropolymer and a plastic polymer mixed with the fluoropolymer, where the plastic polymer is miscible in the fluoropolymer. In some embodiments, the fluoropolymer is a perfluoropolymer. In some embodiments, the fluoropolymer can be any of polytetrafluoroethylene (PTFE), fluorinated ethylene propylene (FEP), ethylene tetrafluoroethylene (ETFE), perfluoro methyl alkoxy (MFA), perfluoroalkoxy alkanes (PFA), ethylene chlorotrifluoroethylene (ECTFE), and polyvinylidene fluoride (PVDF). In some embodiments, the plastic polymer can be any of polyether ether ketone (PEEK), polyphenylene sulfide (PPS), polyphenylsulfone (PPSU), polyether sulfones (PES/PESU), polyarylsulfones (PSU), polyetherketoneketone (PEKK), polypropylene (PP), low-density polyethylene (LDPE), Noryl (blend of PPO polyphenylene ether resin and polystrene), polymethyl methacrylate (PMMA), styrene-ethylene/butylene-styrene (Kraton® SEBS), polyester elastomer (HYTREL®), acrylonitrile butadiene styrene (ABS), polycaprolactam (Nylon 6), polycarbonate (PC), polyolefin grafted nylon-6 (Apolhya® LP2), polystyrene (PS), and polyvinyl chloride (PVC).

In some embodiments, the weight concentration of the fluoropolymer in the separator 10 is at least about 50%. By way of example, the fluoropolymer can have a concentration in a range of about 50 to about 75 weight percent of the separator 10. In some embodiments, the weight concentration of the fluoropolymer in the separator 10 is in a range of about 60 to about 80 weight percent. In some embodiments, the concentration of the fluoropolymer in the separator 10 is in a range of about 70 to about 90 weight percent.

In embodiments described herein, the weight concentration of the plastic polymer in the separator 10 is in a range of about 10 to about 50 weight percent. In some embodiments, the weight concentration of the plastic polymer is in a range of about 20% to about 45%. In some embodiments, the plastic polymer has a weight concentration in a range of about 15% to about 40%. In some embodiments, the plastic polymer has a weight concentration in a range of about 10% to about 35%.

In this embodiment, the separator 10 has a foamed structure. In other words, a plurality of cells (e.g., gas-filled cells) 50 are distributed throughout separator 10 (the size and the density of the cells are not necessarily shown to scale in the figures). While in some embodiments, the cells 50 can be distributed substantially uniformly throughout the separator 10, in other embodiments, the distribution of the cells 50 can be non-uniform. In some embodiments, the cells 50 comprise a volume fraction of the separator 10 in a range of about 10% to about 50%, e.g., in a range of about 15% to about 45%, or in a range of about 20% to about 40%, or in a range of about 20% to about 40%, or in a range of about 25% to about 35%. In some embodiments, at least a portion of the cells, or in some cases the majority or even all of the cells, have a closed structure. In some embodiments, the separator 10 further includes one or more additives, such as a smoke suppressant and/or a flame retardant additive. Some examples of suitable additives include molybdate derivatives, such as molyoxide, ammonium octamolybdate (AOM), calcium molybdate and zinc molybdate, metal oxides, such as Ongard II, zinc and other oxides, borates, such as zinc borate and meta borate, stannates, such as zinc hydroxyl stannates and zinc stannates, Nitrogen-Phosphorus, phosphorus based esters, such as triaryl, tri aklkyl, and ADP, and magnesium hydrates/carbonates, such as magnesium hydroxide, magnesium carbonate, and antimony trioxide, decachlorodiphenyloxide, and alumina trihydrate. In some embodiments, an additive is a combination of 2, 3, 4, 5, 6, or more additives. For example, an additive can comprise zinc oxide, calcium molybdate, or a combination of zinc oxide and calcium molybdate.

Figure 3A:
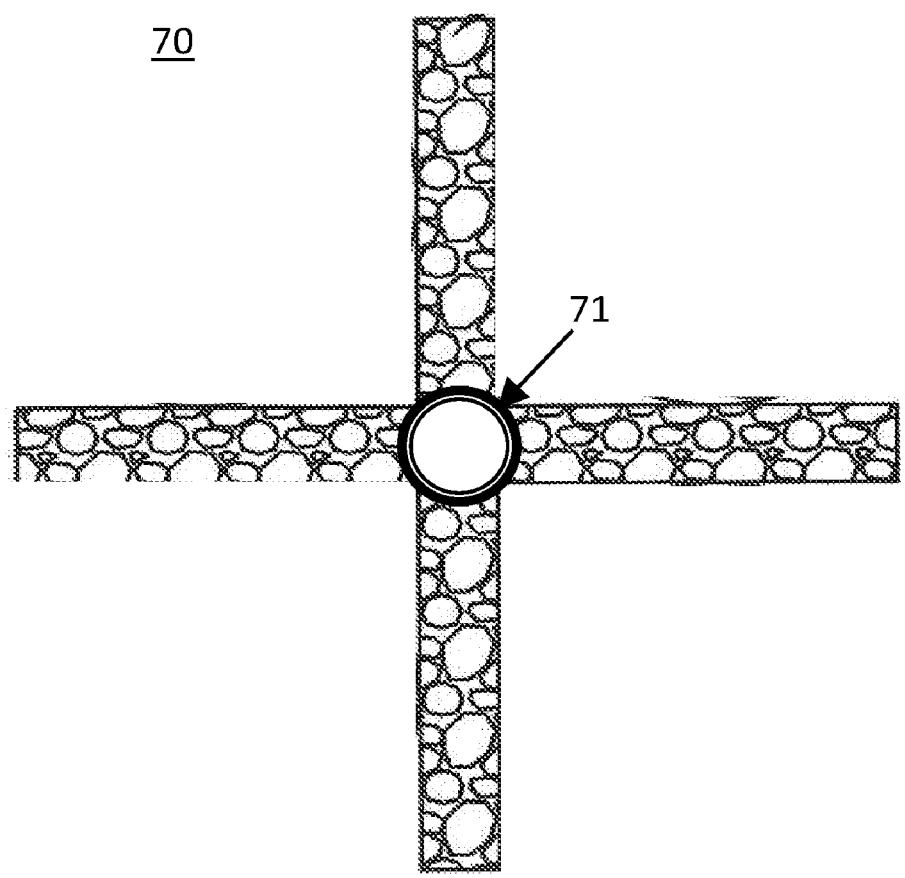
FIG. 3A depicts a cross-sectional view of a foamed separator having a center channel according to another embodiment of the invention.
Figure 3B:
FIG. 3B depicts a longitudinal view of the center channel of FIG. 3A.

FIG. 3A schematically depicts a separator 70 according to another embodiment, which similar to the above separator 10, includes a fluoropolymer and a plastic polymer mixed with the fluoropolymer. The separator 70 further comprises a center channel 71, which is configured for receiving a fiber optic cable and/or an electrical conductor. In some embodiments, center channel 71 is empty (i.e., it does not receive a fiber optic cable and/or an electrical conductor). Such a configuration can allow for the dissipation (e.g., by convection) of heat generated from the electrical conductors disposed in the channels defined by the separator 70. The fiber optic blown tube for fiber and/or electrical conductor channel 71 runs substantially along the center of separator 70. FIG. 3B depicts a longitudinal view of the center channel 71 described and depicted in FIG. 3A.

Figure 4:
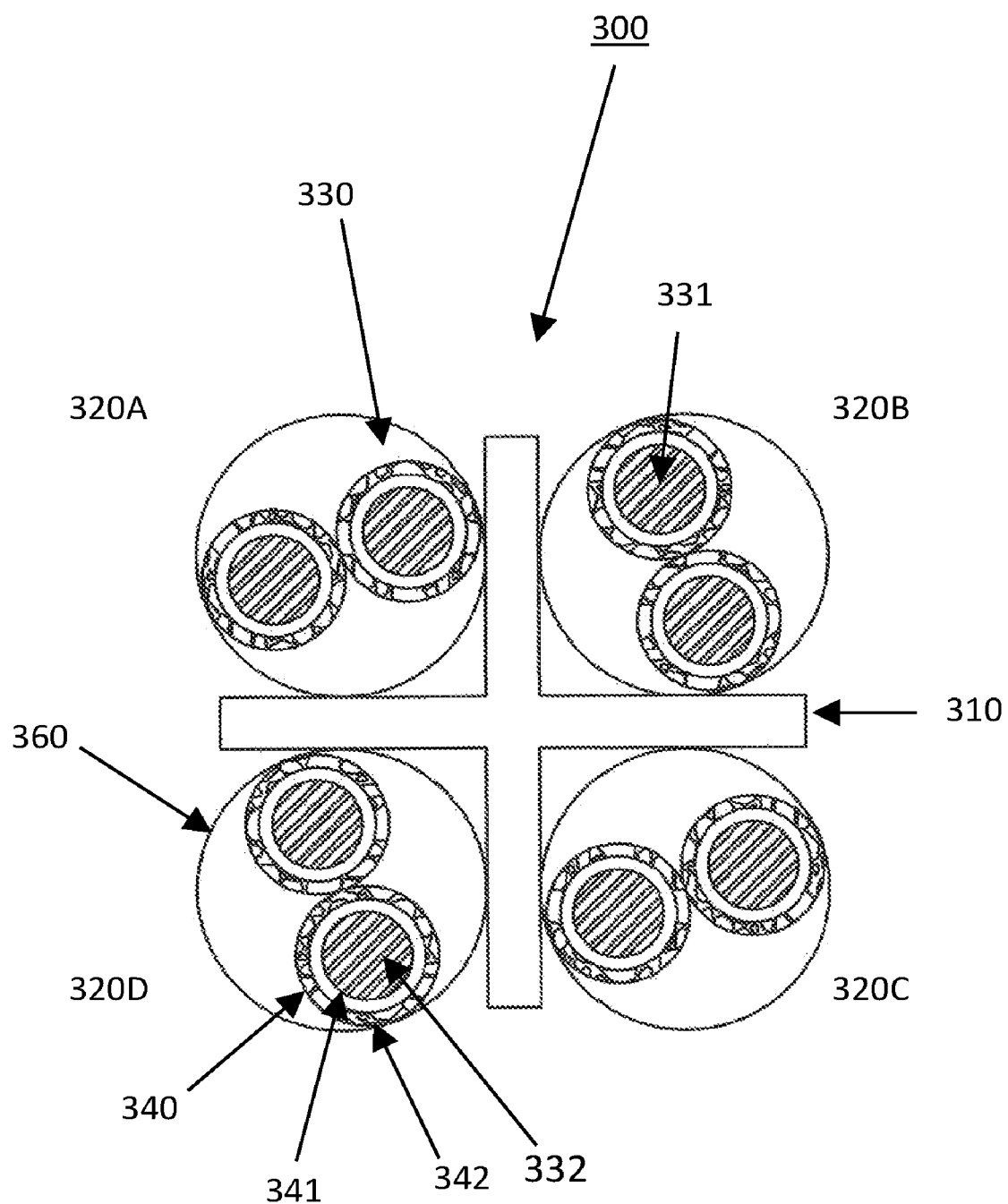
FIG. 4 schematically depicts a cross-sectional view of a separator and a plurality of conductors disposed in longitudinal channels provided by the separator in accordance with an embodiment of the invention.

In some embodiments, a separator according to the present teachings can have a solid structure without gas-filled cellular structures distributed therein, where the separator includes a fluoropolymer mixed with a plastic polymer, where the plastic polymer is miscible in the fluoropolymer. For example, the fluoropolymers and plastic polymers discussed above can be employed. By way of example, FIG. 4 schematically shows a separator 310 according to such an embodiment, which provides a plurality of channels 320A, 320B, 320C, and 320D in which a plurality of conductors (e.g., twisted pairs) can be disposed. The separator 310 minimizes, and preferably eliminates, cross-talk between the conductors 331 disposed in different channels. For example, when conductors 331 are used to transmit telecommunications data at rates up to about 100 Gbits/sec, or in a range of about 1 Mbit/sec to about 100 Gbits/sec, or in a range of about 1 Mbit/sec to about 40 Gbits/sec., the separator 300 can facilitate electromagnetic shielding of the conductors disposed in neighboring channels from one another. The shielding can in turn minimize, and preferably effectively eliminate, the cross-talk between the neighboring conductors at frequencies corresponding to those emitted by the conductors, e.g., frequencies in a range of about 500 MHz to about 1 GHz or a frequencies in a range of about 500 MHz to about 10 GHz.

While the above separators have a cross-shaped cross-sectional profile, in other embodiments the separator can have other shapes. Other exemplary shapes that can be used for separators according to the present teachings are disclosed in US Publication No. 2010/0206609, filed Apr. 6, 2010, entitled "High Performance Support-Separators for Communications Cables Providing Shielding for Minimizing Alien Crosstalk," US Publication No. 2007/0151745, filed Mar. 2, 2007, entitled "High Performance Support-Separators for Communications Cables," US Publication No. 2008/0066947, filed Jul. 16, 2004, entitled "Support Separators for Communications Cable," and U.S. Pat. No. 7,098,405, filed May 1, 2002, entitled "High Performance Support-Separator for Communications Cables," the teachings of which are each incorporated herein by reference in their entirety.

The separators described herein can be used in a variety of cables, including shielded and unshielded cables. A shielded cable comprises a metal braid, metal tape, or both that surrounds the separator to provide shielding of alien cross-talk. In some cases, in use, the metal braid, metal tape, or both can be grounded. The metal braid, metal tape, or both can be in turn surrounded by a jacket, which can be formed of a polymeric material. In some embodiments, the jacket can be formed of a foamable fluoropolymer alloy composition according to the present teachings comprising fluoropolymer and plastic polymer components, such as those discussed above.

In some embodiments, the foamed articles described herein such as the separators, exhibit a foaming level of about 10% to about 80%, e.g., in a range of about 15% to about 70%, or in a range of about 20% to about 60%, or in a range of about 25% to about 50%, or in a range of about 30% to about 40%. In some embodiments, the foaming level is about 10%, about 15%, about 20%, about 25%, about 30%, about 35%, about 40%, about 45%, about 50%, about 55%, about 60%, about 65%, about 70%, about 75%, or about 80%.

Insulation for Electrical Conductors

In some embodiments, the compositions according to the present teachings can be employed to form insulation for electrical conductors, such as copper wires. By way of example, the insulation can be formed of a fluoropolymer and a plastic polymer, such as those discussed above. In some embodiments the insulation can have a foamed structure while in others the insulation is not foamed. In some embodiments, the insulation can include a bi-layer structure in which the inner layer (i.e., the layer in direct contact with the conductor) is a foamed polymeric layer, and the outer layer is either a foamed or a solid polymeric layer. In some embodiments, one or both layers include flame retardant and/or smoke suppressant additives. In some embodiments, a bi-layer structure can be extruded in tandem or co-extruded.

By way of example, FIG. 4 schematically depicts insulated twisted pairs of electrical conductors 331 according to an embodiment of the present teachings, each of which includes a centrally disposed elongated electrical conductor 332 and an insulation 340 that surrounds the electrical conductor. In some embodiments, the electrical conductor 332 can comprise copper or silver, though other metals can also be employed. For example, the electrical conductor 332 can be formed of any of 16, 18, 20, 22, or 24 AWG copper.

In some embodiments, the insulation 340 includes an inner layer 341 and an outer layer 342. The inner layer 341 can completely or partially surround the electrical conductor 331 and the outer layer 342 can completely or partially surround the inner layer 341.

In some embodiments, the thickness of the insulation 340 can be, e.g., in a range of about 0.005 to about 0.009 inches.

By way of example, the inner layer 341 can have a thickness in a range of about 3.5 to about 8 mils and the outer layer 342 can have a thickness in a range of about 3.5 to about 8 mils.

In this embodiment, the inner layer 341, which is in contact with and surrounds the electrical conductor 332, comprises a solid fluoropolymer alloy according to the present teachings, though in other embodiments it can be foamed. The outer layer 342, which surrounds the inner layer 341, is a foamed layer composed of a fluoropolymer and a plastic polymer mixed with the fluoropolymer in accordance with the present teachings. In some embodiments, the outer layer 342 can have a foaming level in a range of about 10% to about 80%, e.g., in a range of about 15% to about 70%, or in a range of about 20% to about 60%, or in a range of about 25% to about 50%, or in a range of about 30% to about 40%. In some embodiments, the foaming level is about 10%, about 15%, about 20%, about 25%, about 30%, about 35%, about 40%, about 45%, about 50%, about 55%, about 60%, about 65%, about 70%, about 75%, or about 80%. In some embodiments, the different layers can include different fluoropolymers and plastic polymers. By way of example, one layer can be formed as a solid structure comprising fluorinated ethylene propylene and polycarbonate, and an adjacent layer can comprise polyvinylidene fluoride and polymethyl methacrylate and can have a foamed structure.

In some embodiments, the insulation can be formed as a single layer comprising the compositions according to the present teachings.

In some embodiments, the insulation can further include additives, such as those listed above.

Tapes

In some embodiments, a flexible tape (e.g., a non-woven tape) can be fabricated using the fluoropolymer alloy compositions according to the present teachings comprising a mixture of one or more fluoropolymer(s) and plastic polymer(s), such as those discussed above.

Figure 7:
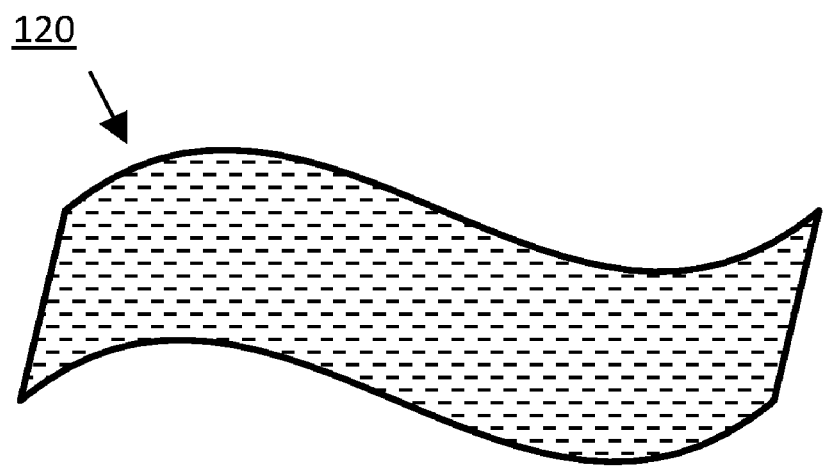
FIG. 7 illustrates a tape in accordance with an embodiment of the invention.

By way of example, FIG. 7 schematically depicts a non-woven tape 120, which comprises a plurality of fibers formed of a fluoropolymer alloy composition described herein. By way of example, the non-woven tape 120 can include a mixture of fluorinated ethylene propylene and polycarbonate or a mixture of polyvinylidene fluoride and polymethyl methacrylate.

In some embodiments, the tape 120 is sufficiently flexible to be configured into a desired shape (e.g., for wrapping around one or more conductors). By way of example, the exemplary tape can be utilized as a flexible separator to electrically isolate (or at least partially electrically isolate) one or more conductors (e.g., a twisted pair) from other conductors. For example, the tape 120 can be wrapped around a separator to enclose the twisted pairs and/or optical fibers disposed in channels provided by the separator.

Cable Jackets

In another aspect, the invention provides a jacket for a cable, e.g., a communications cable, that includes the compositions disclosed herein. In particular, the jacket can include a mixture of a fluoropolymer and a plastic polymer, which is miscible with the fluoropolymer. In some embodiments, the fluoropolymer is a perfluoropolymer. In some embodiments, the fluoropolymer can be any of polytetrafluoroethylene (PTFE), fluorinated ethylene propylene (FEP), ethylene tetrafluoroethylene (ETFE), perfluoro methyl alkoxy (MFA), perfluoroalkoxy alkanes (PFA), ethylene chlorotrifluoroethylene (ECTFE), and polyvinylidene fluoride (PVDF). In some embodiments, the plastic polymer can be any of polyether ether ketone (PEEK), polyphenylene sulfide (PPS), polyphenylsulfone (PPSU), polyether sulfones (PES/PESU), polyarylsulfones (PSU), polyetherketoneketone (PEKK), polypropylene (PP), low-density polyethylene (LDPE), Noryl (blend of PPO polyphenylene ether resin and polystrene), polymethyl methacrylate (PMMA), styrene-ethyl ene/butyl ene-styrene (Kraton® SEBS), polyester elastomer (HYTREL®), acrylonitrile butadiene styrene (ABS), polycaprolactam (Nylon 6), polycarbonate (PC), polyolefin grafted nylon-6 (Apolhya® LP2), polystyrene (PS), and polyvinyl chloride (PVC). In some embodiments, the fluoropolymer alloy composition further comprises a foaming agent, wherein the foaming agent is talc or talc derivative.

While in some embodiments, a cable jacket according to the present teachings can have a solid structure, in other embodiments it can have a foamed structure.

Figure 5:
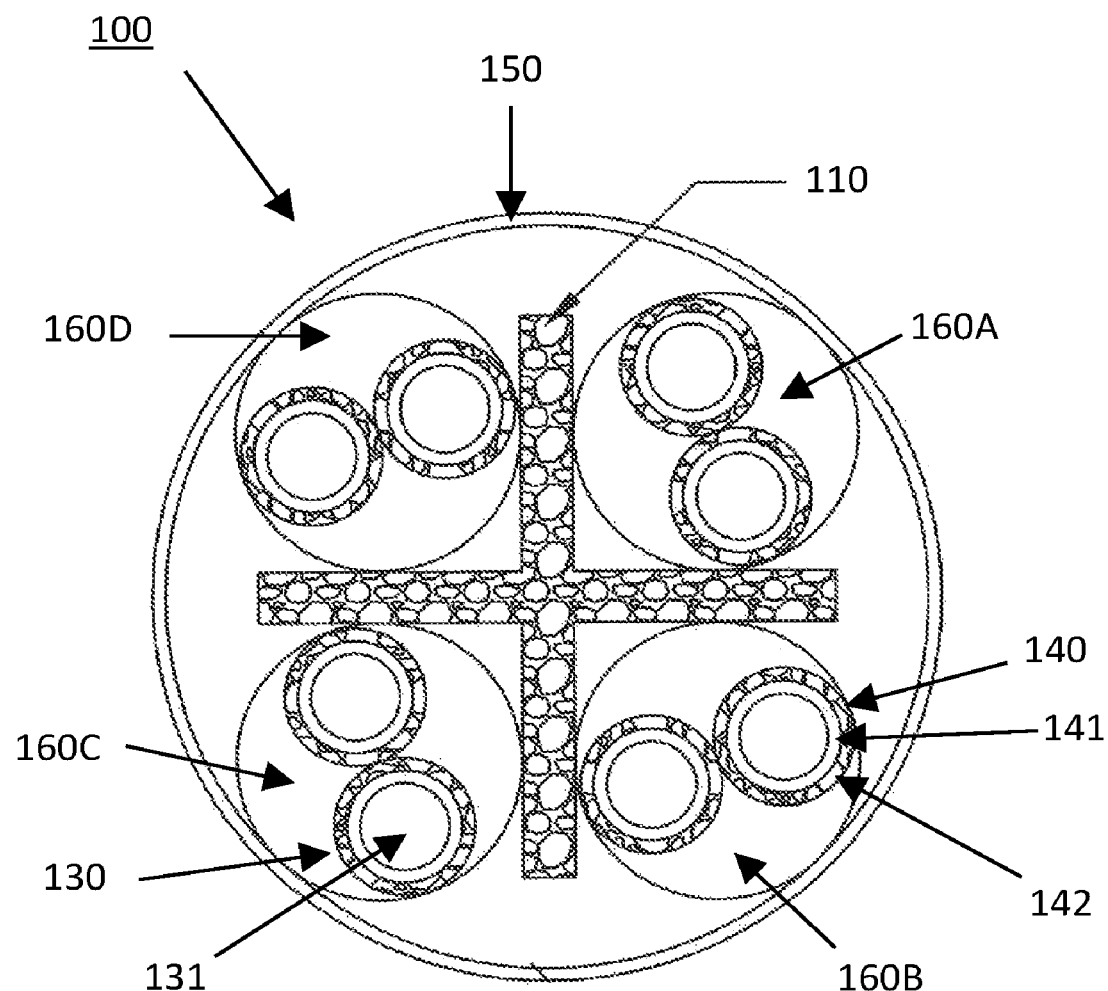
FIG. 5 illustrates a communications cable in accordance with an embodiment of the invention.

By way of example, FIG. 5 schematically depicts a cable jacket 150 according to one embodiment of the invention that has an elongate tubular shape and extends from a proximal end to a distal end. The elongate tubular shape of the cable jacket forms a shell, e.g., a polymeric shell, having an interior lumen, which can be employed to house cable components such as one or more conductors, separators, optical fibers, etc.

In many embodiments, the cable jacket 150 can be particularly effective in lowering alien cross-talk. For example, the cable jacket 150 can be effective at reducing alien cross-talk at a frequency range up to about 40 GHz. For example, the cable jacket can be effective in reducing or mitigating the alien cross-talk beyond the industry-specified swept frequency limits.

The above cable jackets can be manufactured in a variety of ways. In one exemplary method of manufacturing the cable jackets, a composition according to the present teachings can be extruded to form the jacket.

Communications Cables

In another aspect, the invention provides cables, e.g., communications cables, which can comprise one or more of the articles described herein. For example, the communications cables can comprise any one of the separators, conductors having insulation according to the present teachings, tapes, cable jackets and/or the nonwoven fabrics described herein to provide the properties described herein, such as, for example, electromagnetic shielding of the conductors disposed in the cable and flame and smoke retardant properties.

By way of example, FIG. 5 schematically depicts a communications cable 100 accordingly to one embodiment. The cable 100 includes a separator 110 in accordance with the present teachings, e.g., similar to separator 10 discussed above, which provides four channels 160A, 160B, 160C and 160D for receiving transmission media. In this embodiment, the separator 110 has a foamed structure and comprises a mixture of a fluoropolymer and a plastic polymer with cellular structures distributed therein. In this embodiment, transmission media 131 disposed in each channel comprises a twisted pair of conductors 130. Each conductor 131 includes an insulation 140 comprising an inner layer 141 and outer layer 142 according to the present teachings, such as those discussed above.

In some embodiments, the communications cable 100 further comprises a tape (not shown) that completely, or partially, surrounds each of the insulated twisted pair of electrical conductors 130.

The communications cable 100 further comprises a cable jacket 150 formed according to the present teachings. For example, in this embodiment, jacket 150 comprises a mixture of a fluoropolymer and a plastic polymer, where the plastic polymer is miscible in the fluoropolymer. By way of example, the fluoropolymers and plastic polymers discussed above can be employed. While in some embodiments, the jacket 150 has a foamed structure, in other embodiments it does not have a foamed structure.

In some embodiments, the communications cable 100 can also be configured as a Power over Ethernet (PoE) cable. By way of example, in some embodiments, the cable 100 can include at least one twisted pair of conductors, e.g., copper wires, that can transmit communications data as well as electrical power, e.g., electrical power in a range of about 1 watt to about 30 watts. By way of example, such a twisted pair of conductors can include copper wires with a gauge of 18, 20, 22, or 24.

Figure 6:
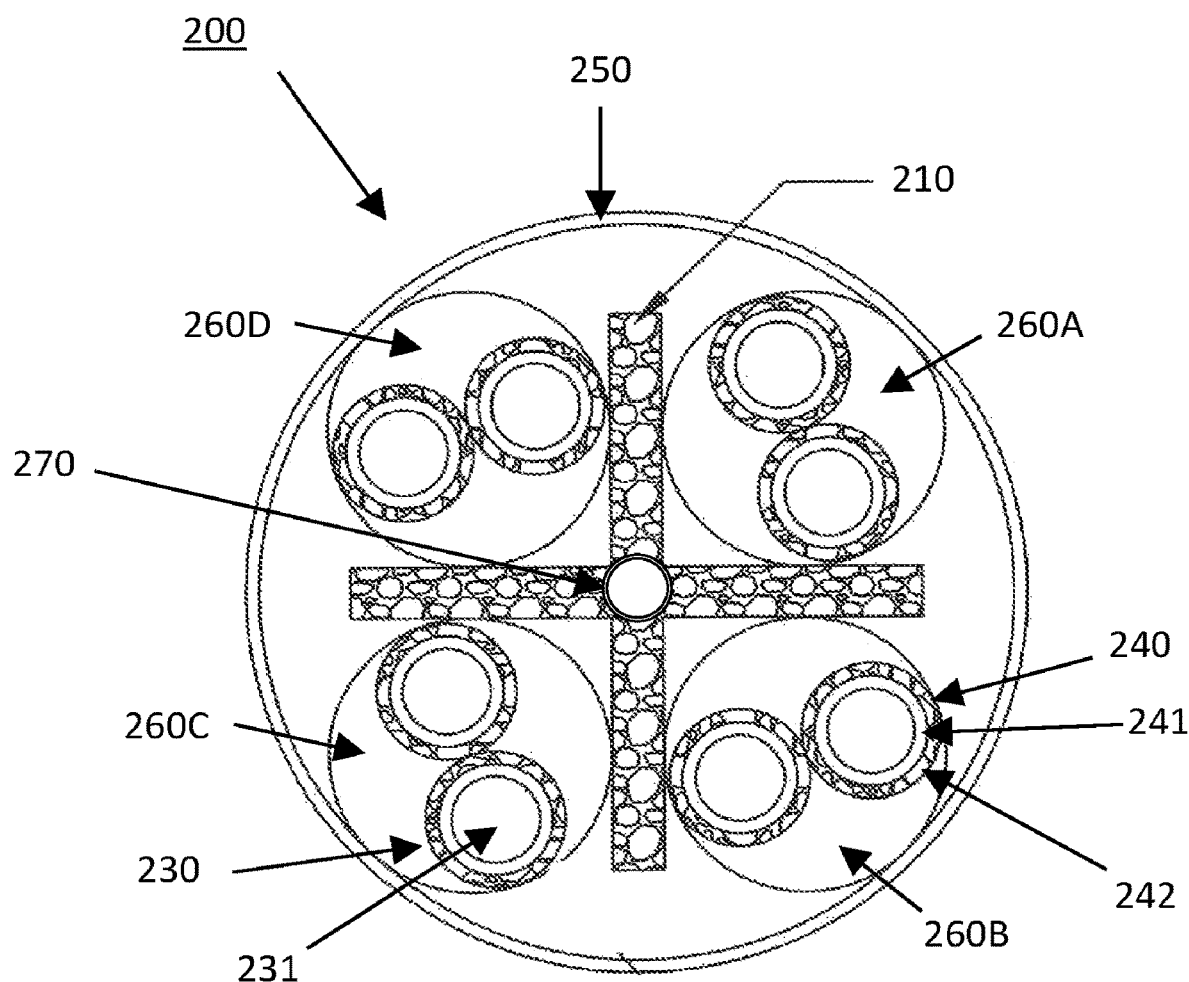
FIG. 6 illustrates another communications cable in accordance with an embodiment of the invention.

FIG. 6 schematically depicts another exemplary embodiment of a communications cable according to the present teachings. Communication cable 200 comprises a separator 210 that provides channels 260A, 260B, 260C and 260D for receiving transmission media. In this embodiment, the separator 210 includes a mixture of a fluoropolymer and a plastic polymer and has a foamed structure. By way of example, the fluoropolymers and the plastic polymers discussed above can be employed for fabricating the separator 210. Separator 210 has a center channel 270 that runs along the length of the separator, which is configured for receiving a fiber optic cable, twisted pair, coax, or strength member.

In some embodiments, center channel 270 can be empty. Such a configuration can allow for the dissipation (e.g., by convection) of heat generated from the electrical conductors disposed in the channels defined by the separator 210.

In this embodiment, transmission media 231 disposed in each channel comprises a twisted pair of conductors 230. Each conductor 230 includes an insulation 240 comprising an inner layer 241 and outer layer 242 according to the present teachings.

In this embodiment, the communications cable 200 further comprises a tape 220 that completely, or partially, surrounds each of the insulated twisted pair of electrical conductors 230.

The communications cable 200 further comprises a cable jacket 250 formed according to the present teachings. For example, in this embodiment, jacket 250 comprises a mixture of a fluoropolymer and a plastic polymer, e.g., in a manner discussed above.

Figure 8:
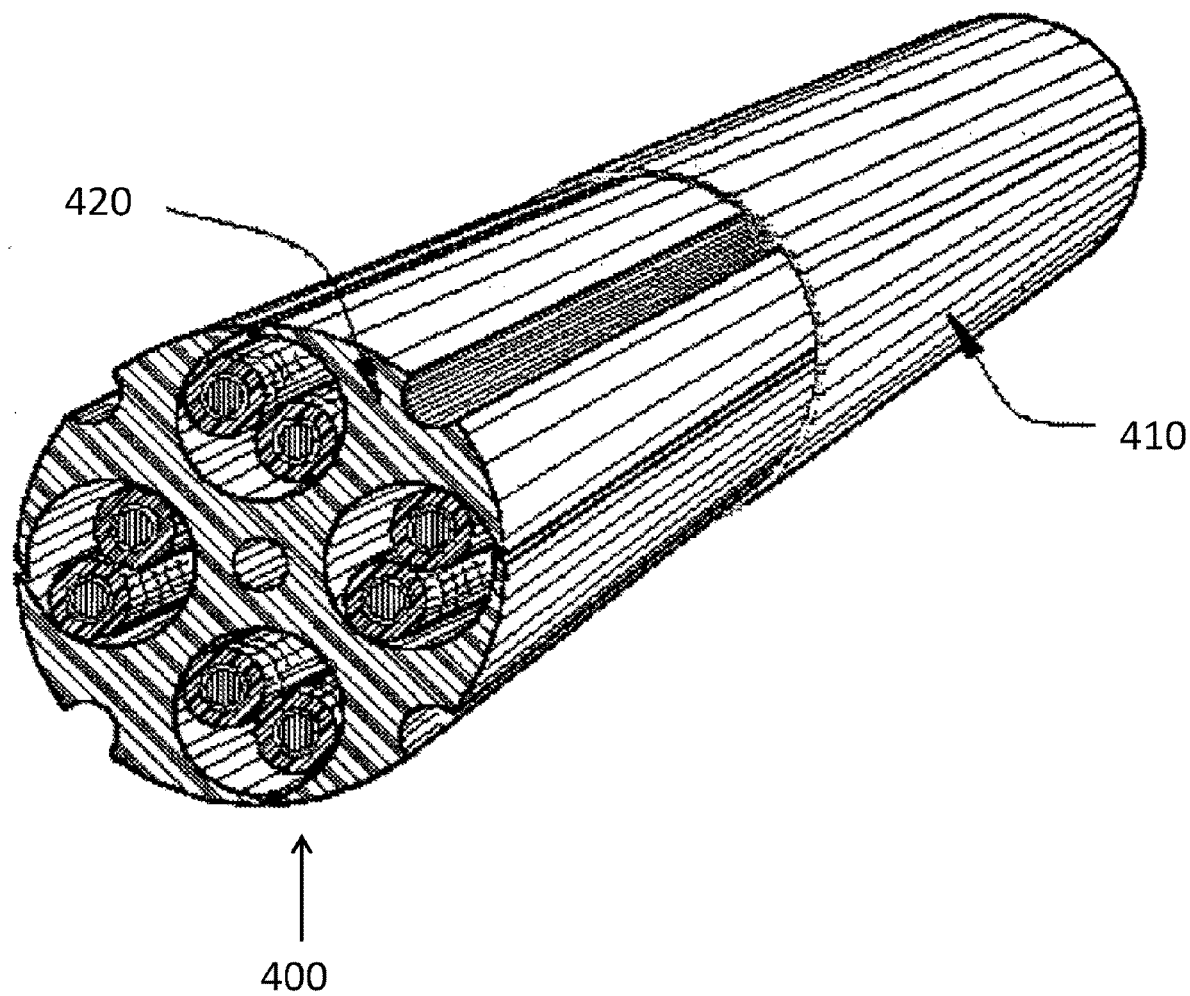
FIG. 8 is a top-right view of one embodiment of the cable and separator that includes an anvil-shaped separator and a smooth/ribbed jacket.

Cable 400, as shown in FIG. 8 is an example of a high performance cable (e.g., a PoE cable) having electrical conductors that carry data, electrical power, or a combination thereof. The cable has an optional outer jacket 410 that can be solid or foamed, comprising a mixture of a fluoropolymer and a plastic polymer. In some embodiments, the fluoropolymer is a perfluoropolymer. In some embodiments, the fluoropolymer can be any of polytetrafluoroethylene (PTFE), fluorinated ethylene propylene (FEP), ethylene tetrafluoroethylene (ETFE), perfluoro methyl alkoxy (MFA), perfluoroalkoxy alkanes (PFA), ethylene chlorotrifluoroethylene (ECTFE), and polyvinylidene fluoride (PVDF). In some embodiments, the plastic polymer is selected from the group consisting of polyether ether ketone (PEEK), polyphenylene sulfide (PPS), polyphenylsulfone (PPSU), polyether sulfones (PES/PESO), polyarylsulfones (PSU), polyetherketoneketone (PEKK), polypropylene (PP), low-density polyethylene (LDPE), Noryl (blend of PPO polyphenylene ether resin and polystrene), polymethyl methacrylate (PMMA), styrene-ethylene/butylene-styrene (Kraton® SEBS), polyester elastomer (HYTREL®), acrylonitrile butadiene styrene (ABS), polycaprolactam (Nylon 6), polycarbonate (PC), polyolefin grafted nylon-6 (Apolhya® LP2), polystyrene (PS), and polyvinyl chloride (PVC). In this embodiment, the cable 400 includes a separator 420, which has a plurality of arms extending from a center of the separator to a flap top.

Figure 9:
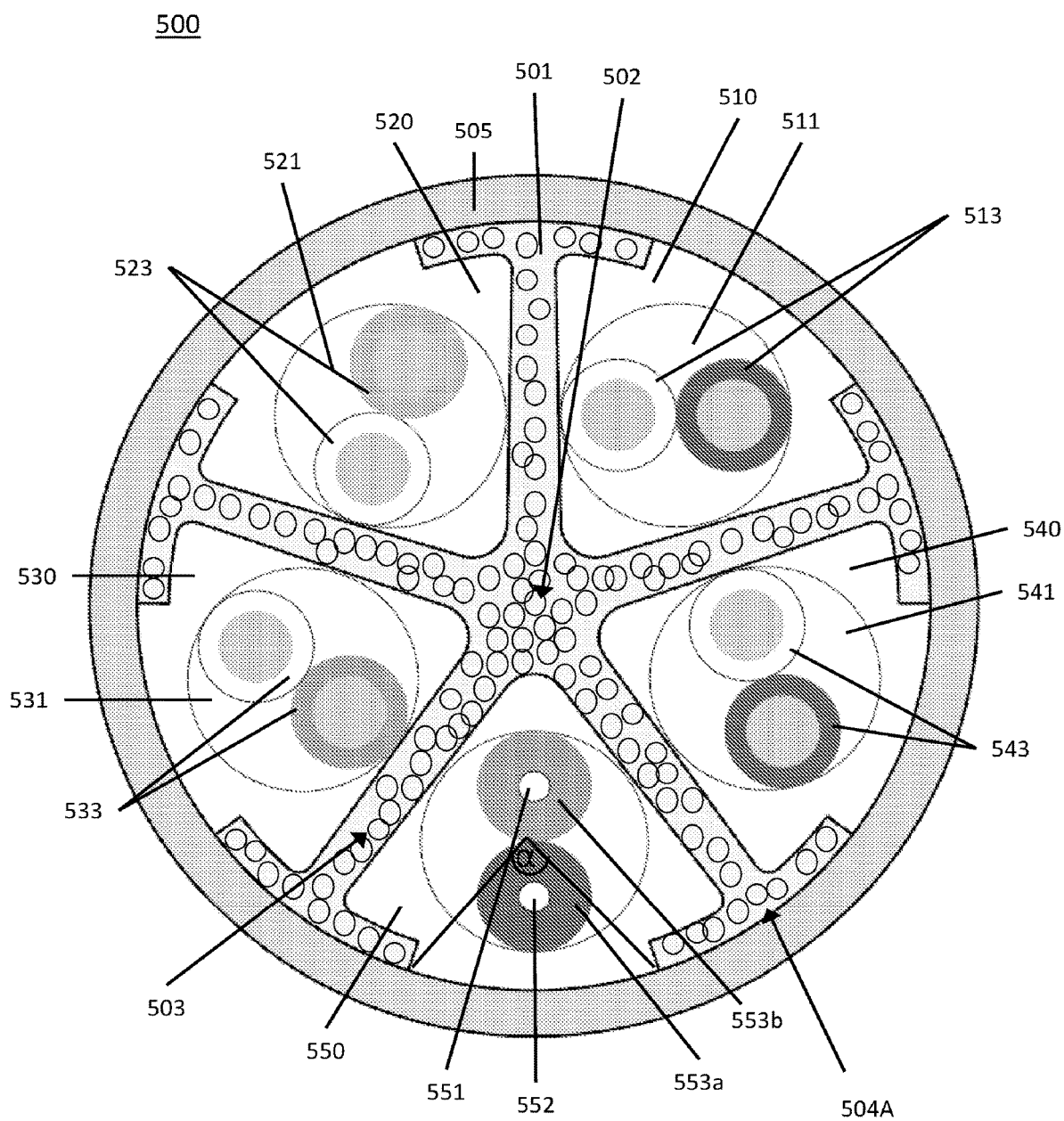
FIG. 9 illustrates an embodiment of a jacketed Power over Ethernet 4-pair copper cable having five channels in one of which two fiber optic cables are disposed.

FIG. 9 schematically depicts a communication cable 500, which includes a support separator 501 providing five channels 510, 520, 530, 540, 550 for receiving transmission media. The support separator 501 includes a central portion 502 and a plurality of arms 503 extending radially from the central portion 502 such that the channels 510, 520, 530, 540, 550 are provided between the plurality of arms 503. In this embodiment, each arm 503 extends from the central portion 502 to a flap top portion 504A. In this embodiment, two adjacent flap top portions 504A partially enclose one of the channels 510, 520, 530, 540, 550. In other embodiments, at least two adjacent flap top portions can circumferentially extend so as to cooperatively substantially or completely enclose a channel. In other embodiments, the arms of the separator may not extend to a flap top portion. Further, while in this embodiment the separator 501 is configured to provide five channels for receiving transmission media, in other embodiments, the number of channels can be less or more. In this embodiment, the angle subtended by the opening associated with each of the channels between the respective portions of the flap tops partially closing that channel, e.g., the angle α formed between the lines connecting the center of the channel 550 to the edges of the two flap tops associated with that channel, can be less than about 160 degrees. As the size of the flap tops increases, this angle decreases.

The support separator 501 can be solid or foamed, comprising a mixture of a fluoropolymer and a plastic polymer. In some embodiments, the fluoropolymer is a perfluoropolymer. In some embodiments, the fluoropolymer can be any of polytetrafluoroethylene (PTFE), fluorinated ethylene propylene (FEP), ethylene tetrafluoroethylene (ETFE), perfluoro methyl alkoxy (MFA), perfluoroalkoxy alkanes (PFA), ethylene chlorotrifluoroethylene (ECTFE), and polyvinylidene fluoride (PVDF). In some embodiments, the plastic polymer is selected from the group consisting of polyether ether ketone (PEEK), polyphenylene sulfide (PPS), polyphenylsulfone (PPSU), polyether sulfones (PES/PESU), polyarylsulfones (PSU), polyetherketoneketone (PEKK), polypropylene (PP), low-density polyethylene (LDPE), Noryl (blend of PPO polyphenylene ether resin and polystrene), polymethyl methacrylate (PMMA), styrene-ethylene/butylene-styrene (Kraton® SEBS), polyester elastomer (HYTREL®), acrylonitrile butadiene styrene (ABS), polycaprolactam (Nylon 6), polycarbonate (PC), polyolefin grafted nylon-6 (Apolhya® LP2), polystyrene (PS), and polyvinyl chloride (PVC).

In this embodiment, the support separator 501 has a foamed structure and includes a plurality of cellular structures 502 distributed therein.

In this embodiment, a twisted pair of electrical conductors (e.g., copper wires) 511, 521, 531 and 541 is disposed in each of channels 510, 520, 530, and 540. Each twisted pair of electrical conductors 511, 521, 531 and 541 can be configured to carry electrical data, power, or combinations thereof. In this embodiment, the electrical conductors are configured to carry both power and communications data. For example, each twisted pair of electrical conductors 511, 521, 531 and 541 is capable of carrying at least about 10 watts of electrical power. By way of example, each twisted pair of electrical conductors can be capable of carrying electrical power in a range of about 10 watts to about 200 watts, e.g., in a range of about 20 watts to about 100 watts. In this embodiment, each electrical conductor can be configured to carry at least about 10 watts of power (e.g., 10 watts, 20 watts, 30 watts, 40 watts, 50 watts, 60 watts, or more than 60 watts). In some implementations, the electrical conductors of the twisted pairs can have a gauge (AWG) in a range of about 22 to about 26. Also, each twisted pair 511, 521, 531 and 541 can have an electrical insulation 513, 523, 533 and 543 wrapped around it.

In this embodiment, two optical fibers 551 and 552 are disposed within the channel 550. A variety of different types of optical fibers can be employed. For example, the optical fibers 551, 552 can be a single-mode or a multi-mode optical fiber for transmission of optical radiation (e.g., radiation at telecommunications wavelengths, e.g., at 1550 nm) from a proximal end of the cable to its distal end. The optical fibers 551, 552 are enclosed within buffer tubes 553a and 553b.

A jacket 505 surrounds the separator 501 and the transmission media disposed in the channels provided by the separator 501. The jacket 505 can be formed using the compositions described herein.

Figure 10:
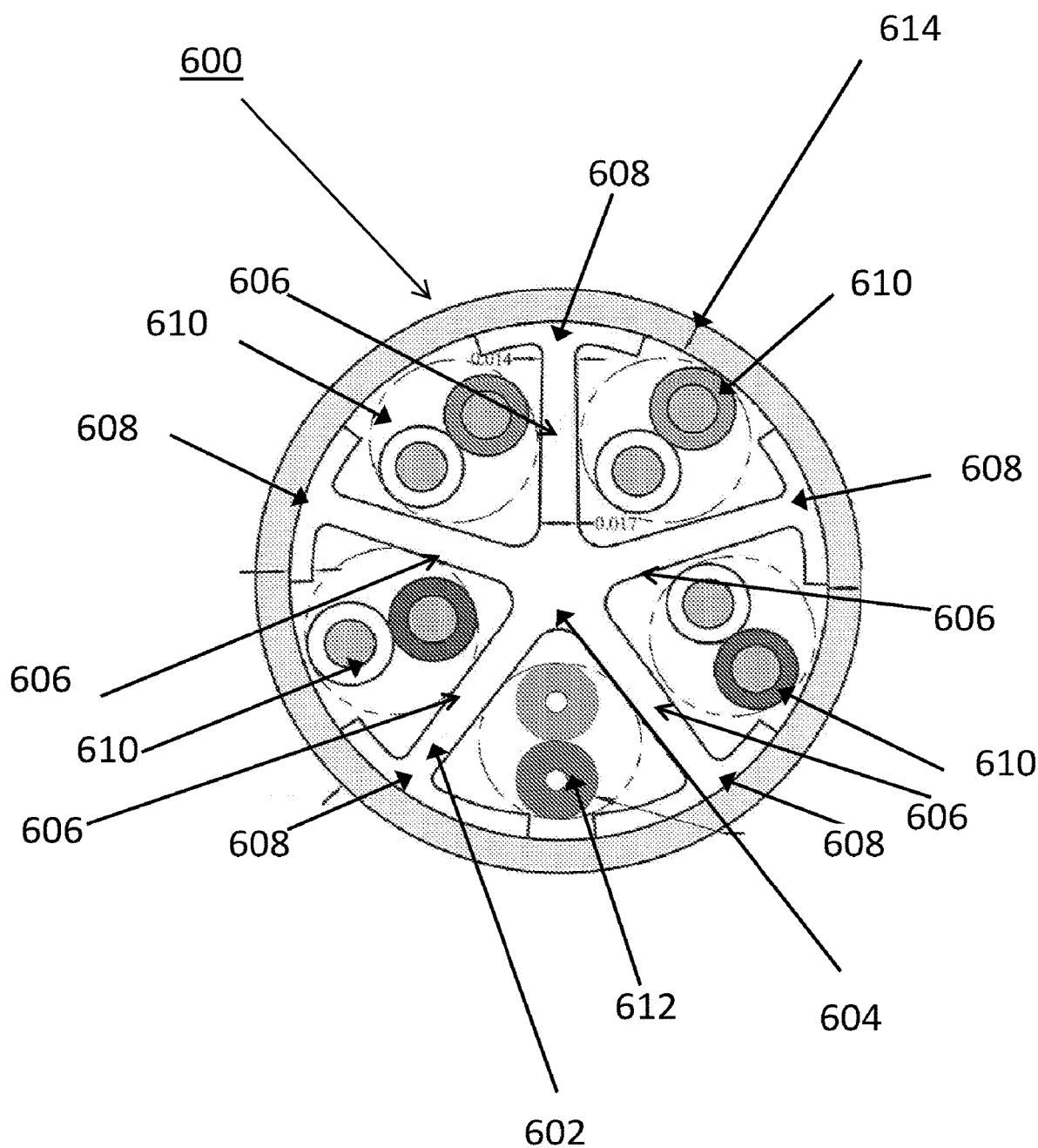
FIG. 10 illustrates an embodiment of a communications cable according to the present teachings.

By way of further illustration, FIG. 10 schematically depicts a telecommunications cable 600 according to an embodiment of the present teachings. The cable 600 includes a support separator 602, which has a solid structure formed of a mixture of a fluoropolymer and a plastic polymer. The support separator 602 includes a central portion 604 and a plurality of arms 606 extending radially from the central portion 604. The arms 606 are arranged to provide five channels for receiving transmission media. In particular, in this embodiment, twisted pairs of wires 610 are disposed in four of the channels and a pair of optical fibers 612 are disposed in one of the channels. In this embodiment, each arm 606 terminates in a flap top 608. In this embodiment, the angle subtended by the opening associated with each of the channels between the respective portions of the flap tops partially closing that channel can be less than about 160 degrees. While in some embodiments, this angle can be uniform for the different channels, in this embodiment, the respective angle for the channel containing the pair of optical fibers is smaller than the angles associated with the other channels. A jacket 614 surrounds the support separator and the transmission media. In some embodiments, the jacket 614 can include a mixture of a fluoropolymer and a plastic polymer.

Methods of Fabrication

A variety of methods can be used for fabricating the compositions and the articles discussed above. For example, in one method, pellets of an alloy blend of at least one fluoropolymer and a plastic polymer can be fabricated via extrusion using either twin screw extruders or Buss kneading extruders. In some embodiments, similar methods can be used to form foamable pellets comprising a fluoropolymer, a plastic polymer and a chemical foaming agent (e.g., talc). In some cases, the use of a Buss kneeding extruder can limit the amount of heat, thus increasing the foamability of the pellets produced.

The pellets can be put through a second and independent melt processable extrusion process utilizing a new die to transform the polymer alloy into the desired foamed profile. The limitations to foaming in such methods can be partially, if not completely, overcome by directly extruding the profile from a premixed blend of a desired fluoropolymer, a plastic polymer and in some cases a chemical foaming agent. The premixed blend is then further blended during the extrusion process at relatively low heat so as not to reduce foamability.

As the composition proceeds towards the die it is heated to the optimum temperature to obtain a desired foaming level for the profile.

The following examples are provided to further illustrate various aspects of the invention. The examples are provided only for illustrative purposes and not to necessarily indicate the optimal ways of practicing the invention or optimal results that can be obtained.

EXAMPLES

Example 1

Elongation, tensile strength, and specific gravity have been tested for a variety of compositions. Table 4 provides elongation and tensile strength for a solid blend composition comprising 85% FEP and 15% polycarbonate by weight. The composition is formed using a twin screw extruder at the temperature profile described in Table 5. This composition provides an average 252% elongation, and an average tensile strength of 3444 psi.

TABLE 4

| 85% FEP + 15% Polycarbonate (Solid blend) | | | | | | |
|---|---|---|---|---|---|---|
| Sample ID | Thickness (in) | Width (in) | Surface area (in²) | Force max (lbs) | Elongation (%) | Tensile strength (PSI) |
| 1 | 0.0400 | 0.2500 | 0.0100 | 33.10 | 250 | 3310 |
| 2 | 0.0420 | 0.2500 | 0.0105 | 34.90 | 240 | 3324 |
| 3 | 0.0390 | 0.2500 | 0.0098 | 34.80 | 260 | 3569 |
| 4 | 0.0400 | 0.2500 | 0.0100 | 32.70 | 270 | 3270 |
| 5 | 0.0405 | 0.2500 | 0.0101 | 35.80 | 240 | 3536 |
| 6 | 0.0380 | 0.2500 | 0.0095 | 34.70 | 250 | 3653 |
| AVG | | | | | 252 | 3444 |

TABLE 5

| Temperature Profile for 85% FEP + 15% Polycarbonate (Solid blend) | |
|---|---|
| Heat Zone | Setting |
| Zone 1 | 0° F. |
| Zone 2 | 200° F. |
| Zone 3 | 500° F. |
| Zone 4 | 600° F. |
| Zone 5 | 575° F. |
| Zone 6 | 600° F. |
| Zone 7 | 575° F. |
| Zone 8 | 575° F. |
| Zone 9 | 550° F. |
| Zone 10 | 500° F. |
| Zone 11 | 425° F. |
| Zone 12 | 425° F. |
| Head | 610° F. |
| Die | 610° F. |

The tape version was formed using single screw extruder, "coat-hanger" die and standard profile dies, using the temperature profile described in Table 6. Table 7 provides the specific gravity of this blend in tape form, wherein the average is 1.9084.

TABLE 6

Processing Conditions for the FEP +
Polycarbonate Extruded Tapes

| Heat Zone | Setting |
|---|---|
| Zone 1 | 580° F. |
| Zone 2 | 610° F. |
| Zone 3 | 620° F. |
| Flange | 630° F. |
| Head | 640° F. |
| Die 1 | 650° F. |

TABLE 7

Specific Gravity on 85% FEP +
15% Polycarbonate (Solid blend) Tapes

| Sample ID | 1 | 2 | 3 |
|---|---|---|---|
| Weight in Air | 0.8257 | 0.8069 | 0.8115 |
| Weight in Water | 0.3935 | 0.3845 | 0.3854 |
| Specific Gravity | 1.9105 | 1.9103 | 1.9045 |
| Average Specific Gravity | 1.9084 | | |

Example 2

A solid blend composition comprising 70% FEP and 30% polycarbonate was formed by twin screw extruder using the temperature profile described in Table 8. Table 9 provides elongation and tensile strength for this solid blend composition. This composition provides an average 203% elongation and an average tensile strength of 4525 psi. Table 10 provides the specific gravity of this blend in tape form, wherein the average is 1.7161.

TABLE 8

Temperature Profile for 70% FEP +
30% Polycarbonate (Solid blend)

| Heat Zone | Setting |
|---|---|
| Zone 1 | 0° F. |
| Zone 2 | 200° F. |
| Zone 3 | 500° F. |
| Zone 4 | 600° F. |
| Zone 5 | 575° F. |
| Zone 6 | 600° F. |
| Zone 7 | 575° F. |
| Zone 8 | 575° F. |
| Zone 9 | 550° F. |
| Zone 10 | 500° F. |
| Zone 11 | 425° F. |
| Zone 12 | 425° F. |
| Head | 610° F. |
| Die | 610° F. |

TABLE 9

70% FEP + 30% Polycarbonate (Solid blend)

| Sample ID | Thickness (in) | Width (in) | Surface area (in$^2$) | Force max (lbs) | Elongation (%) | Tensile strength (PSI) |
|---|---|---|---|---|---|---|
| 1 | 0.0395 | 0.2500 | 0.0099 | 44.50 | 200 | 4506 |
| 2 | 0.0435 | 0.2500 | 0.0109 | 50.50 | 180 | 4644 |
| 3 | 0.0455 | 0.2500 | 0.0114 | 48.90 | 210 | 4299 |
| 4 | 0.0425 | 0.2500 | 0.0106 | 43.60 | 220 | 4104 |
| 5 | 0.0415 | 0.2500 | 0.0104 | 50.50 | 210 | 4867 |
| 6 | 0.0415 | 0.2500 | 0.0104 | 49.10 | 200 | 4733 |
| AVG | | | | | 203 | 4525 |

TABLE 10

Specific Gravity on 70% FEP +
30% Polycarbonate (Solid blend) Tapes

| Sample ID | 1 | 2 | 3 |
|---|---|---|---|
| Weight in Air | 0.8091 | 0.7735 | 0.8065 |
| Weight in Water | 0.3369 | 0.3240 | 0.3360 |
| Specific Gravity | 1.7135 | 1.7208 | 1.7141 |
| Average Specific Gravity | 1.7161 | | |

Example 3

A solid blend composition composed of 60% FEP and 40% polycarbonate was formed, in a manner discussed above in connection with the previous examples. Table 11 provides elongation and tensile strength for this solid blend composition. This composition provides an average 117% elongation and an average tensile strength of 5037 psi. Table 12 provides the specific gravity of this blend in tape form, wherein the average is 1.6200.

TABLE 11

60% FEP + 40% Polycarbonate (Solid blend)

| Sample ID | Thickness (in) | Width (in) | Surface area (in$^2$) | Force max (lbs) | Elongation (%) | Tensile strength (PSI) |
|---|---|---|---|---|---|---|
| 1 | 0.0365 | 0.2500 | 0.0091 | 45.70 | 110 | 5008 |
| 2 | 0.0350 | 0.2500 | 0.0088 | 46.90 | 120 | 5360 |
| 3 | 0.0345 | 0.2500 | 0.0086 | 48.20 | 110 | 5588 |
| 4 | 0.0400 | 0.2500 | 0.0100 | 46.20 | 130 | 4620 |
| 5 | 0.0390 | 0.2500 | 0.0098 | 45.90 | 100 | 4708 |
| 6 | 0.0375 | 0.2500 | 0.0094 | 46.30 | 130 | 4939 |
| AVG | | | | | 117 | 5037 |

TABLE 12

Specific Gravity on 60% FEP +
40% Polycarbonate (Solid blend) Tapes

| Sample ID | 1 | 2 | 3 |
|---|---|---|---|
| Weight in Air | 0.7137 | 0.7227 | 0.7220 |
| Weight in Water | 0.2721 | 0.2772 | 0.2768 |
| Specific Gravity | 1.6162 | 1.6222 | 1.6217 |
| Average Specific Gravity | 1.6200 | | |

Example 4

A foamed composition comprising PVDF with a foaming rate of about 16.2% was fabricated. To form the composition, solid PVDF and foamable pellets of PVDF at a 3:1 mixture were mixed. PVDF Composition was foamed using a Buss kneader using temperature profiles described in Table 13. Table 14 provides elongation and tensile strength for this foamed composition. This composition provides an average 93% elongation and an average tensile strength of 2852 psi.

TABLE 8

Temperature Profile for Solid PVDF + Foamable pellets 3:1 Mix (16.2% foam rate)

| Heat Zone | Setting |
| --- | --- |
| Kneader Screw | 260 |
| Zone 1 | 0 |
| Zone 2 | 400 |
| Zone 3 | 400 |
| Zone 4 | 390 |
| Zone 5 | 390 |
| Zone 6 | 380 |
| Zone 7 | 380 |
| Melt Pump | 375 |
| Die | 260 |

TABLE 14

Solid PVDF + Foamable pellets 3:1 Mix (16.2% foam rate)

| Sample ID | Thickness (in) | Width (in) | Surface area (in$^2$) | Force max (lbs) | Elongation (%) | Tensile strength (PSI) |
| --- | --- | --- | --- | --- | --- | --- |
| 1 | 0.0265 | 0.2500 | 0.0066 | 18.10 | 100 | 2732 |
| 2 | 0.0275 | 0.2500 | 0.0069 | 19.20 | 110 | 2793 |
| 3 | 0.0275 | 0.2500 | 0.0069 | 19.00 | 100 | 2764 |
| 4 | 0.0270 | 0.2500 | 0.0068 | 19.50 | 80 | 2889 |
| 5 | 0.0260 | 0.2500 | 0.0065 | 19.40 | 100 | 2985 |
| 6 | 0.0270 | 0.2500 | 0.0068 | 19.90 | 70 | 2948 |
| AVG | | | | | 93 | 2852 |

The tape version was formed using single screw extruder, "coat-hanger" die and standard profile dies, using the temperature profile described in Table 15.

TABLE 15

Processing Conditions for the Solid PVDF + Foamble Pellets as Extruded Tapes on a Single Screw Extruder

| Heat Zone | Setting |
| --- | --- |
| Zone 1 | 380° F. |
| Zone 2 | 390 F. |
| Zone 3 | 420° F. |
| Flange | 430° F. |
| Head | 440° F. |
| Die 1 | 440° F. |

Example 5

A foamed composition comprising PVDF with a foaming rate of 10% was fabricated. Solid PVDF and foamable pellets of PVDF at a 3:1 mix were formed using a Buss kneader using a temperature profile described in Table 16. Table 17 provides elongation and tensile strength for a number of samples of the foamed composition. This composition provides an average 445% elongation and an average tensile strength of 4268 psi.

TABLE 16

Processing Conditions for the Solid PVDF + Foamable pellets 3:1 Mix (10% foam rate)

| Heat Zone | Setting |
| --- | --- |
| Kneader Screw | 260 |
| Zone 1 | 0 |
| Zone 2 | 400 |
| Zone 3 | 400 |
| Zone 4 | 390 |
| Zone 5 | 390 |
| Zone 6 | 380 |
| Zone 7 | 380 |
| Melt Pump | 375 |
| Die | 260 |

TABLE 17

Solid PVDF + Foamable pellets 3:1 Mix (10% foam rate)

| Sample ID | Thickness (in) | Width (in) | Surface area (in$^2$) | Force max (lbs) | Elongation (%) | Tensile strength (PSI) |
| --- | --- | --- | --- | --- | --- | --- |
| 1 | 0.0255 | 0.2500 | 0.0064 | 28.30 | 430 | 4439 |
| 2 | 0.0265 | 0.2500 | 0.0066 | 27.80 | 450 | 4196 |
| 3 | 0.0260 | 0.2500 | 0.0065 | 29.20 | 480 | 4492 |
| 4 | 0.0250 | 0.2500 | 0.0063 | 27.00 | 430 | 4320 |
| 5 | 0.0270 | 0.2500 | 0.0068 | 28.10 | 450 | 4163 |
| 6 | 0.0265 | 0.2500 | 0.0066 | 26.50 | 430 | 4000 |
| AVG | | | | | 445 | 4268 |

Example 6

A foamed composition comprising PVDF and plastic polymer, PMMA, with a foaming level of 25% was fabricated. To form the foamed composition, solid PVDF and foamable pellets of PMMA at a 3:1 mix were blended using a Buss kneader using the temperature profile described in Table 18. Table 19 provides elongation and tensile strength for a plurality of samples of the foamed composition. This composition provides an average 46.7% elongation and an average tensile strength of 1874.4 psi.

TABLE 18

Processing Conditions for Solid PVDF + Foamable pellets 3:1 Mix + 10% PMMA (25.0% foam rate)

| Heat Zone | Setting |
| --- | --- |
| Kneader Screw | 260 |
| Zone 1 | 0 |
| Zone 2 | 400 |
| Zone 3 | 400 |
| Zone 4 | 390 |
| Zone 5 | 390 |
| Zone 6 | 380 |
| Zone 7 | 380 |
| Melt Pump | 375 |
| Die | 260 |

TABLE 19

Solid PVDF + Foamable pellets 3:1 Mix + 10% PMMA (25.0% foam rate)

| Sample ID | Thickness (in) | Width (in) | Surface area (in$^2$) | Force max (lbs) | Elongation (%) | Tensile strength (PSI) |
|---|---|---|---|---|---|---|
| 1 | 0.0335 | 0.2500 | 0.0084 | 14.30 | 40 | 1707.5 |
| 2 | 0.0345 | 0.2500 | 0.0086 | 15.20 | 60 | 1762.3 |
| 3 | 0.0325 | 0.2500 | 0.0081 | 14.90 | 50 | 1833.8 |
| 4 | 0.0320 | 0.2500 | 0.0080 | 16.00 | 40 | 2000.0 |
| 5 | 0.0310 | 0.2500 | 0.0078 | 15.90 | 50 | 2051.6 |
| 6 | 0.0330 | 0.2500 | 0.0083 | 15.60 | 40 | 1890.9 |
| AVG | | | | | 46.7 | 1874.4 |

The tape version was foamed using single screw extruder, "coat-hanger" die and standard profile dies, using the temperature profile described in Table 20.

TABLE 20

Processing Conditions for the Solid PVDF + PMMA as Extruded Tapes on a Single Screw Extruder

| Heat Zone | Setting |
|---|---|
| Zone 1 | 380° F. |
| Zone 2 | 390 F. |
| Zone 3 | 420° F. |
| Flange | 430° F. |
| Head | 440° F. |
| Die 1 | 440° F. |

Example 7

A foamed composition comprising a mixture of PVDF and PMMA with a foam rate of 12.5% was formed. Using a blend of Talc and MgCO$_3$ foaming agents, solid PVDF and foamable pellets of PVDF at a 3:1 mix were blended with 10% PMMA by weight and formed using a twin screw extruder using a temperature profile as described in Table 21. Table 22 provides elongation and tensile strength for the foamed composition. This composition provides an average 382% elongation and an average tensile strength of 3654 psi.

TABLE 21

Temperature Profile for Solid PVDF + Foamable pellets 3:1 Mix + 10% PMMA (12.5% foam rate)

| Heat Zone | Setting |
|---|---|
| Zone 1 | 0° F. |
| Zone 2 | 200° F. |
| Zone 3 | 350° F. |
| Zone 4 | 350° F. |
| Zone 5 | 225° F. |
| Zone 6 | 200° F. |
| Zone 7 | 175° F. |
| Zone 8 | 150° F. |
| Zone 9 | 150° F. |
| Zone 10 | 150° F. |
| Zone 11 | 150° F. |
| Head | 400° F. |
| Die | 400° F. |

TABLE 22

Solid PVDF + Foamable pellets 3:1 Mix + 10% PMMA (12.5% foam rate)

| Sample ID | Thickness (in) | Width (in) | Surface area (in$^2$) | Force max (lbs) | Elongation (%) | Tensile strength (PSI) |
|---|---|---|---|---|---|---|
| 1 | 0.0270 | 0.2500 | 0.0068 | 24.90 | 390 | 3689 |
| 2 | 0.0275 | 0.2500 | 0.0069 | 24.50 | 380 | 3564 |
| 3 | 0.0270 | 0.2500 | 0.0068 | 24.60 | 380 | 3644 |
| 4 | 0.0275 | 0.2500 | 0.0069 | 24.90 | 380 | 3622 |
| 5 | 0.0280 | 0.2500 | 0.0070 | 25.60 | 400 | 3657 |
| 6 | 0.0270 | 0.2500 | 0.0068 | 25.30 | 360 | 3748 |
| AVG | | | | | 382 | 3654 |

Those having ordinary skill in the art will appreciate that various changes can be made to the above embodiments without departing from the scope of the invention. Further, various features of one embodiment may be used in another embodiment. The numerical ranges recited herein are intended to encompass each numerical value contained in the range.

What is claimed is:

1. A foamed article, comprising:
   a fluoropolymer,
   a plastic polymer mixed with said fluoropolymer, wherein said plastic polymer is miscible with said fluoropolymer,
   a plurality of cellular structures distributed throughout said mixture of the fluoropolymer and the plastic polymer.

2. The foamed article of claim 1, wherein said cellular structures are present at a volume concentration in a range of about 10% to about 50%.

3. The foamed article of claim 1, wherein at least a portion of said cellular structures are closed structures.

4. The foamed article of claim 1, wherein said plastic polymer is amorphous.

5. The foamed article of claim 1, wherein said plastic polymer is characterized by a glass transition temperature.

6. The foamed article of claim 1, wherein said article exhibits a tensile strength greater than a tensile strength of said fluoropolymer.

7. The foamed article of claim 1, wherein said article has a tensile strength of greater than 2,500 psi.

8. The foamed article of claim 1, wherein said fluoropolymer comprises at least about 50% weight percent of said article.

9. The foamed article of claim 1, wherein said fluoropolymer has a concentration in a range of about 50% to about 75% weight percent of said article.

10. The foamed article of claim 1, wherein said plastic polymer has a concentration in a range of about 25% to about 50% weight percent of said composition.

11. The foamed article of claim 1, wherein said fluoropolymer is a perfluoropolymer.

12. The foamed article of claim 1, wherein said fluoropolymer is selected from the group consisting of polytetrafluoroethylene (PTFE), fluorinated ethylene propylene (FEP), ethylene tetrafluoroethylene (ETFE), perfluoro methyl alkoxy (MFA), perfluoroalkoxy alkanes (PFA), ethylene chlorotrifluoroethylene (ECTFE), and polyvinylidene fluoride (PVDF).

13. The foamed article of claim 1, wherein said plastic polymer is selected from the group consisting of polyether ether ketone (PEEK), polyphenylene sulfide (PPS), polyphenylsulfone (PPSU), polyether sulfones (PES/PESU), polyarylsulfones (PSU), polyetherketoneketone (PEKK), polypropylene (PP), low-density polyethylene (LDPE), a blend of PPO polyphenylene ether resin and polystyrene, polymethyl methacrylate (PMMA), styrene-ethylene/butylene-styrene, polyester elastomer, acrylonitrile butadiene styrene (ABS), polycaprolactam (Nylon 6), polycarbonate (PC), polyolefin grafted nylon 6, polystyrene (PS), and polyvinyl chloride (PVC).

14. The foamed article of claim 11, wherein the perfluoropolymer is fluorinated ethylene propylene (FEP) and the amorphous plastic is polycarbonate (PC).

15. The foamed article of claim 11, wherein the perfluoropolymer is polyvinylidene fluoride (PVDF) and the amorphous plastic is polymethyl methacrylate (PMMA).

16. The foamed article of claim 2, wherein said foamed article exhibits a tensile strength of at least about 2500 psi.

17. The foamed article of claim 1, wherein said foamed article exhibits a foaming level in a range of about 10% to about 50%.

* * * * *